(12) United States Patent
Anabuki et al.

(10) Patent No.: US 12,497,075 B2
(45) Date of Patent: Dec. 16, 2025

(54) INFORMATION PROCESSING METHOD AND INFORMATION PROCESSING SYSTEM

(71) Applicant: Panasonic Intellectual Property Management Co., Ltd., Osaka (JP)

(72) Inventors: Motoshi Anabuki, Hyogo (JP); Kazuma Takeuchi, Kyoto (JP); Ryota Ohnishi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 226 days.

(21) Appl. No.: 17/843,379

(22) Filed: Jun. 17, 2022

(65) Prior Publication Data

US 2022/0315056 A1    Oct. 6, 2022

Related U.S. Application Data

(63) Continuation of application No. PCT/JP2021/006268, filed on Feb. 19, 2021.

(30) Foreign Application Priority Data

Apr. 13, 2020 (JP) .................................. 2020-071960

(51) Int. Cl.
  B60W 60/00 (2020.01)
  G05D 1/00 (2024.01)

(52) U.S. Cl.
  CPC ....... B60W 60/0018 (2020.02); G05D 1/0038 (2013.01); B60W 2556/45 (2020.02);
  (Continued)

(58) Field of Classification Search
  None
  See application file for complete search history.

(56) References Cited

U.S. PATENT DOCUMENTS

2017/0192423 A1* 7/2017 Rust .................... G05D 1/0212
2018/0364705 A1  12/2018 Yunoki et al.
(Continued)

FOREIGN PATENT DOCUMENTS

| JP | 2010-61346 | 3/2010 |
|----|------------|--------|
| JP | 2018-63615 | 4/2018 |

(Continued)

OTHER PUBLICATIONS

Extended European Search Report issued Aug. 11, 2023 in corresponding European Patent Application No. 21764013.5.
(Continued)

*Primary Examiner* — Madison R. Inserra
(74) *Attorney, Agent, or Firm* — Wenderoth, Lind & Ponack, L.L.P.

(57) ABSTRACT

An information processing method is an information processing method executed by a computer, and includes: detecting a first operation by a supervising party that supervises a moving body which drives autonomously from a remote location where the moving body cannot be supervised directly; and when the first operation is detected, relaxing an execution condition for autonomous driving of the moving body more than an execution condition applied when the first operation is not detected, and causing the moving body to drive autonomously under the execution condition that has been relaxed.

17 Claims, 32 Drawing Sheets

Related U.S. Application Data

(60) Provisional application No. 62/984,530, filed on Mar. 3, 2020.

(52) U.S. Cl.
CPC ..... *B60W 2710/20* (2013.01); *B60W 2720/10* (2013.01); *B60W 2720/106* (2013.01)

(56) References Cited

U.S. PATENT DOCUMENTS

| | | | |
|---|---|---|---|
| 2019/0187691 A1* | 6/2019 | Magzimof | B60W 60/007 |
| 2019/0196464 A1 | 6/2019 | Lockwood et al. | |
| 2019/0302760 A1 | 10/2019 | Katou et al. | |
| 2019/0339692 A1 | 11/2019 | Sakai et al. | |
| 2019/0361436 A1 | 11/2019 | Ueda et al. | |
| 2020/0019166 A1 | 1/2020 | Fairfield et al. | |
| 2020/0406914 A1* | 12/2020 | Zhang | G05D 1/0016 |
| 2021/0072743 A1* | 3/2021 | Otaki | B60W 50/14 |
| 2021/0149389 A1* | 5/2021 | Weslosky | G05D 1/0038 |
| 2023/0133577 A1* | 5/2023 | Larsson | G05D 1/0223 701/26 |

FOREIGN PATENT DOCUMENTS

| | | | |
|---|---|---|---|
| JP | 2018-142265 | 9/2018 | |
| JP | 2018-165931 | 10/2018 | |
| JP | 2018-165932 | 10/2018 | |
| JP | 2019-3403 | 1/2019 | |
| JP | 2019-16118 | 1/2019 | |
| WO | 2018/079028 | 5/2018 | |
| WO | WO-2018079028 A1 * | 5/2018 | ........ B60W 30/0956 |
| WO | 2018/155159 | 8/2018 | |

OTHER PUBLICATIONS

Hadjira Belaidi et al., "Human-Robot Shared Control for Path Generation and Execution", International Journal of Social Robotics, vol. 11, No. 4, Jan. 2019, pp. 609-620.

International Search Report (ISR) issued on May 11, 2021 in International (PCT) Application No. PCT/JP2021/006268.

* cited by examiner

Second vehicle information

| Current vehicle speed | 15 km/h |
|---|---|
| Current steering angle | 45 deg. |
| Travel mode | Auto |
| Run state | Stopped |
| ODD deviation information | Travel in opposite lane required |

FIG. 9

ODD data (a)

| Travelable area |
| --- |
| Own lane |
| Opposite lane |

(b)

| Objects to be passed |
| --- |
| Vehicle (on shoulder) |
| Color cones |
| Vehicle (traveling in front) |

FIG. 10

Constraints (a)

| Vehicle conditions | |
| --- | --- |
| Max vehicle speed | 10 km/h |
| Max steering angle | 45 deg. |
| Max acceleration | 0.3 G |
| System response time | 0.8 s |

(b)

| Safety supervision conditions | |
| --- | --- |
| Supervision required area | Own lane Opposite lane |
| Supervision substitution for remote operating party | OK (only person with low fatigue level) |

(c)

| System conditions | |
| --- | --- |
| Communication delay | 0.2 s |
| System state | Normal |

FIG. 11

First vehicle information (specs)

| Max vehicle speed | 20 km/h |
|---|---|
| Max steering angle | 45 deg. |
| Max acceleration | 0.3 G |
| System response time | 0.75 s |
| Supervisable region | Own lane |

FIG. 12

First remote operation information (a)

| Information pertaining to remote operation device ||
|---|---|
| Supervisable region | Opposite lane |

(b)

| Information pertaining to remote operating party (specs) ||
|---|---|
| Permissions | Remote operation |

FIG. 13

First system information (specs)

| Minimum communication delay | 0.1 s |
|---|---|

FIG. 17

Second remote operation information
(current state)

| Fatigue level | Low |
|---|---|

FIG. 18

Second system information
(current state)

| Communication delay | 0.2 s |
|---|---|
| System state | Normal |

Travel permission command

| Timestamp | 15:03:11.10 |
| Command | Continue travel |

FIG. 24A

Autonomous travel mode

| ODD |
|---|
| Objects to be passed |
| Vehicle (on shoulder) |
| Color cones |
|  |
|  |

| Constraints ||
|---|---|
| Vehicle conditions ||
| Max vehicle speed | 20 km/h |
| Max steering angle | 45 deg. |
| Max acceleration | 0.3 G |
| Safety supervision conditions ||
| Objects requiring remote supervision | None |

FIG. 24B

ODD relaxed travel mode

| ODD |  |
|---|---|
| Objects to be passed | |
| Vehicle (on shoulder) | |
| Color cones | |
| Vehicle (traveling in front) | |
| Pedestrians (at rest) | |

| Constraints | |
|---|---|
| Vehicle conditions | |
| Max vehicle speed | 5 km/h |
| Max steering angle | 45 deg. |
| Max acceleration | 0.3 G |
| Safety supervision conditions | |
| Objects requiring remote supervision | Vehicle in front |

FIG. 26A

Autonomous travel mode

| ODD |
|---|
| Travelable area |
| Own lane |
|  |

| Constraints ||
|---|---|
| Vehicle conditions ||
| Max vehicle speed | 20 km/h |
| Max steering angle | 45 deg. |
| Max acceleration | 0.3 G |
| Safety supervision conditions ||
| Supervised region | Own lane |

FIG. 26B

ODD relaxed travel mode

| ODD |
|---|
| Travelable area |
| Own lane |
| Opposite lane |

| Constraints ||
|---|---|
| Vehicle conditions ||
| Max vehicle speed | 5 km/h |
| Max steering angle | 45 deg. |
| Max acceleration | 0.3 G |
| Safety supervision conditions ||
| Supervised region | Own lane<br>Opposite lane |

FIG. 28A

Autonomous travel mode

| ODD |
|---|
| Travel unable conditions |
| Earthquake (intensity: 3 or higher) |
| Heavy rain (precipitation: 200 mm or more) |
| Dense fog (visibility: 60 m or less) |
| Strong wind (wind speed: 15 m/s or higher) |

| Constraints ||
|---|---|
| Vehicle conditions ||
| Max vehicle speed | 20 km/h |
| Max steering angle | 45 deg. |
| Max acceleration | 0.3 G |
| Safety supervision conditions ||
| Supervised region | Own lane |

FIG. 28B

ODD relaxed travel mode

| ODD |
|---|
| Travel unable conditions |
| ~~Earthquake (intensity: 3 or higher)~~ |
| Heavy rain (precipitation: 200 mm or more) |
| Dense fog (visibility: 60 m or less) |
| Strong wind (wind speed: 15 m/s or higher) |

| Constraints | |
|---|---|
| Vehicle conditions | |
| Max vehicle speed | 10 km/h |
| Max steering angle | 45 deg. |
| Max acceleration | 0.3 G |

| Safety supervision conditions | |
|---|---|
| Supervised region | Own lane (double-check by vehicle and remote operating party) |

FIG. 30A

Autonomous travel mode

| ODD |  |
|---|---|
| Travel unable area state | |
| Frozen road surface | |
| Flooded road surface (10 cm or more) | |
| Constraints | |
| Vehicle conditions | |
| Max vehicle speed | 20 km/h |
| Max steering angle | 45 deg. |
| Max acceleration | 0.3 G |
| Safety supervision conditions | |
| Supervised region | Own lane |

FIG. 30B

ODD relaxed travel mode

| ODD | |
|---|---|
| Travel unable area state | |
| ~~Frozen road surface~~ | |
| Flooded road surface (10 cm or more) | |
| Constraints | |
| Vehicle conditions | |
| Max vehicle speed | 5 km/h |
| Max steering angle | 45 deg. |
| Max acceleration | 0.1 G |
| Safety supervision conditions | |
| Supervised region | Own lane (double-check by vehicle and remote operating party) |

FIG. 32A

Autonomous travel mode

| ODD | |
|---|---|
| Travel unable conditions | |
| Earthquake (intensity: 3 or higher) | |
| Heavy rain (precipitation: 200 mm or more) | |
| Dense fog (visibility: 60 m or less) | |
| Strong wind (wind speed: 15 m/s or higher) | |
| Objects to be passed | |
|  | |

| Constraints | |
|---|---|
| Vehicle conditions | |
| Max vehicle speed | 20 km/h |
| Max steering angle | 45 deg. |
| Max acceleration | 0.3 G |
| Safety supervision conditions | |
| Supervised region | Own lane |
| Objects requiring remote supervision | None |

FIG. 32B

First ODD relaxed travel mode

| ODD | |
|---|---|
| Travel unable conditions | |
| ~~Earthquake (intensity: 3 or higher)~~ | |
| Heavy rain (precipitation: 200 mm or more) | |
| Dense fog (visibility: 60 m or less) | |
| Strong wind (wind speed: 15 m/s or higher) | |
| Objects to be passed | |
|  | |

| Constraints | |
|---|---|
| Vehicle conditions | |
| Max vehicle speed | 10 km/h |
| Max steering angle | 45 deg. |
| Max acceleration | 0.3 G |
| Safety supervision conditions | |
| Supervised region | Own lane (double-check by vehicle and remote operating party) |
| Objects requiring remote supervision | None |

FIG. 32C

Second ODD relaxed travel mode

| ODD | |
|---|---|
| Travel unable conditions | |
| ~~Earthquake (intensity: 3 or higher)~~ | |
| Heavy rain (precipitation: 200 mm or more) | |
| Dense fog (visibility: 60 m or less) | |
| Strong wind (wind speed: 15 m/s or higher) | |
| Objects to be passed | |
| Vehicle (on shoulder) | |
| Constraints | |
| Vehicle conditions | |
| Max vehicle speed | 5 km/h |
| Max steering angle | 45 deg. |
| Max acceleration | 0.3 G |
| Safety supervision conditions | |
| Supervised region | Own lane (double-check by vehicle and remote operating party) |
| Objects requiring remote supervision | Vehicle in front |

INFORMATION PROCESSING METHOD AND INFORMATION PROCESSING SYSTEM

CROSS REFERENCE TO RELATED APPLICATIONS

This is a continuation application of PCT International Application No. PCT/JP2021/006268 filed on Feb. 19, 2021, designating the United States of America, which is based on and claims priority of U.S. Provisional Patent Application No. 62/984,530 filed on Mar. 3, 2020 and Japanese Patent Application No. 2020-071960 filed on Apr. 13, 2020. The entire disclosures of the above-identified applications, including the specifications, drawings and claims are incorporated herein by reference in their entirety.

FIELD

The present disclosure relates to an information processing method and an information processing system.

BACKGROUND

In recent years, remote operation systems are being investigated in which a remote operating party at a remote location uses wireless communication such as a wireless local area network (LAN) or a cellular phone line to indirectly operate a moving body capable of autonomous travel as needed. The remote operating party controls the travel of the moving body from the remote location by, for example, transmitting control signals pertaining to the travel of the moving body to the moving body when the moving body is no longer capable of traveling autonomously.

For example, PTL 1 discloses a remote operation system which displays a predicted movement path and the like of a moving body in an image showing the travel direction of a moving body in accordance with a communication delay time between the moving body and a remote operation device.

CITATION LIST

Patent Literature

PTL 1: Japanese Unexamined Patent Application Publication No. 2010-61346

SUMMARY

Technical Problem

However, a remote operation system such as that disclosed in PTL 1 places a heavy burden on the remote operating party. For example, the field of view of a remote operating screen is narrower than the field of view in the moving body, and thus the remote operating party must be more careful then when operating from within the moving body.

Accordingly, an object of the present disclosure is to provide an information processing method and an information processing system capable of reducing the burden on a remote operating party in a remote location.

Solution to Problem

An information processing method according to one aspect of the present disclosure is an information processing method executed by a computer, and includes: detecting a first operation by a supervising party that supervises a moving body which drives autonomously from a remote location where the moving body cannot be supervised directly; when the first operation is detected, relaxing an execution condition for autonomous driving of the moving body more than an execution condition applied when the first operation is not detected; and causing the moving body to drive autonomously under the execution condition that has been relaxed.

An information processing system according to one aspect of the present disclosure includes: a detector that detects a first operation by a supervising party that supervises an autonomously-driving moving body from a remote location where the moving body cannot be supervised directly; and a mode changer that, when the first operation is detected, relaxes an execution condition for autonomous driving of the moving body more than an execution condition applied when the first operation is not detected, and causes the moving body to drive autonomously under the execution condition that has been relaxed.

Advantageous Effects

According to an information processing method and the like of one aspect of the present disclosure, the burden on a remote operating party in a remote location can be reduced.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 9 is a diagram illustrating an example of ODD data.

FIG. 10 is a diagram illustrating an example of constraints.

FIG. 11 is a diagram illustrating an example of first vehicle information.

FIG. 12 is a diagram illustrating an example of first remote operation information.

FIG. 13 is a diagram illustrating an example of first system information.

FIG. 17 is a diagram illustrating an example of second remote operation information.

FIG. 18 is a diagram illustrating an example of second system information.

FIG. 24A is a diagram illustrating various conditions in an autonomous travel mode in the first application example.

FIG. 24B is a diagram illustrating various conditions in an ODD relaxed travel mode in the first application example.

FIG. 26A is a diagram illustrating various conditions in an autonomous travel mode in the second application example.

FIG. 26B is a diagram illustrating various conditions in an ODD relaxed travel mode in the second application example.

FIG. 28A is a diagram illustrating various conditions in an autonomous travel mode in the third application example.

FIG. 28B is a diagram illustrating various conditions in an ODD relaxed travel mode in the third application example.

FIG. 30A is a diagram illustrating various conditions in an autonomous travel mode in the fourth application example.

FIG. 30B is a diagram illustrating various conditions in an ODD relaxed travel mode in the fourth application example.

FIG. 32A is a diagram illustrating various conditions in an autonomous travel mode in the fifth application example.

FIG. 32B is a diagram illustrating various conditions in a first ODD relaxed travel mode in the fifth application example.

FIG. 32C is a diagram illustrating various conditions in a second ODD relaxed travel mode in the fifth application example.

DESCRIPTION OF EMBODIMENTS

Findings Leading to Present Disclosure

Figure 1:
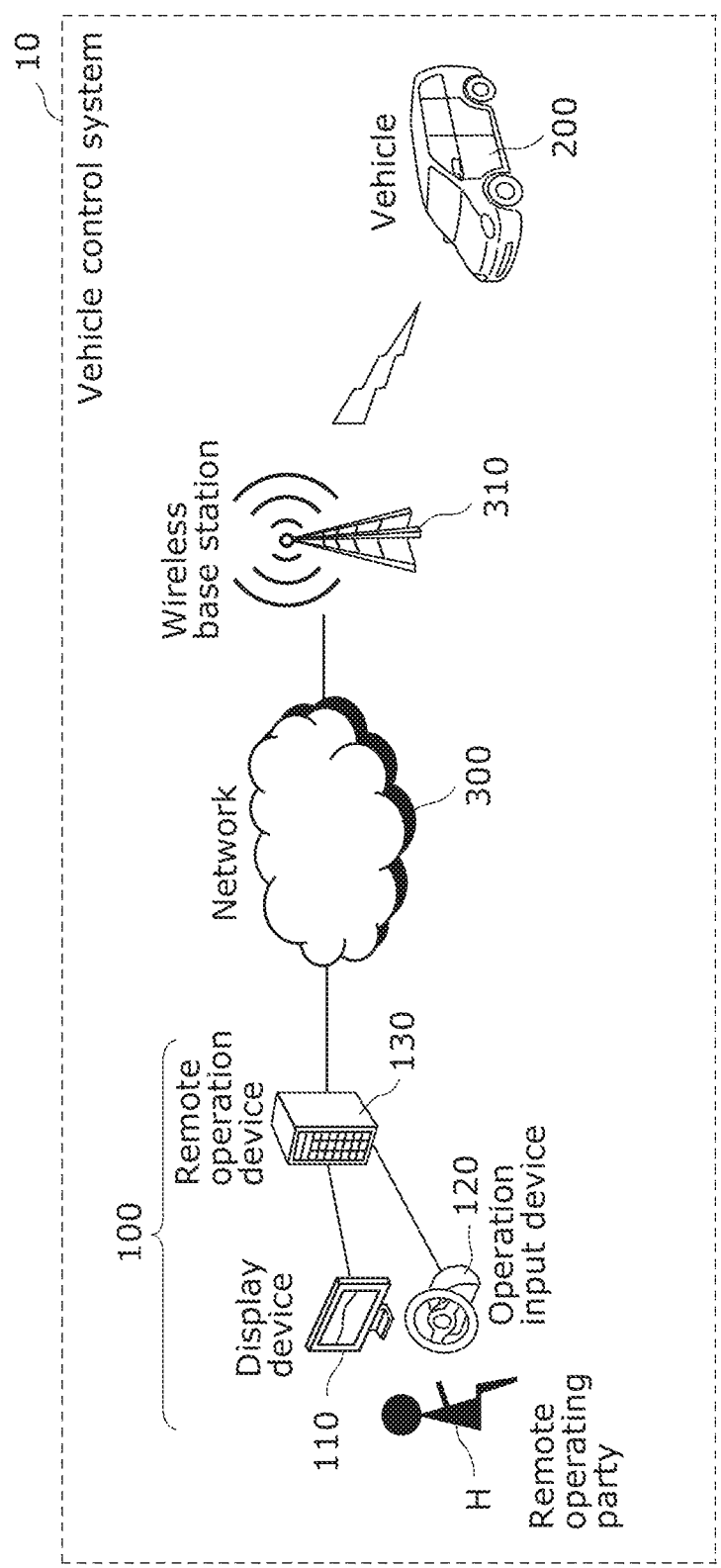
FIG. 1 is a diagram illustrating the overall configuration of a vehicle control system according to an embodiment.

Autonomous driving systems are provided with Operational Design Domains (ODDs) set from a safety perspective, which limit the conditions under which autonomous travel can be performed. The ODD conditions become more stringent as the autonomous driving level increases, and at autonomous driving level 4, the travel area and travel conditions are greatly restricted. Accordingly, as the autonomous driving level rises, the travel may deviate from the ODD conditions and autonomous travel may not be possible. A remote operating party in a remote location remotely operating the vehicle is being considered for such cases. However, having the remote operating party remotely operate the vehicle each time the travel deviates from the ODD conditions places a heavy burden on the remote operating party. For example, in PTL 1, the operability during remote operation is improved by performing remote operation using a joystick or the like, but under conditions involving operation delay and a limit visual field, a heavy burden is placed on the remote operating party even if an improved user interface is provided.

Furthermore, it is necessary to ensure a minimum level of travel safety during autonomous travel. This minimum level of travel safety is, for example, that the vehicle does not collide with objects.

Accordingly, the inventors of this application diligently studied information processing methods and the like capable of reducing the burden on a remote operating party, and furthermore, information processing methods and the like capable of reducing the burden on a remote operating party while ensuring a minimum level of safety, and arrived at the information processing method and the like described hereinafter.

Note that ODD is an example of an execution condition for autonomous driving.

An information processing method according to one aspect of the present disclosure is an information processing method executed by a computer, and includes: detecting a first operation by a supervising party that supervises a moving body which drives autonomously from a remote location where the moving body cannot be supervised directly; when the first operation is detected, relaxing an execution condition for autonomous driving of the moving body more than an execution condition applied when the first operation is not detected; and causing the moving body to drive autonomously under the execution condition that has been relaxed.

Through this, when, for example, the moving body cannot travel through autonomous driving, the moving body can perform autonomous driving under the relaxed execution condition by the supervising party performing the first operation. In other words, even if the moving body has entered a state where travel through autonomous driving is not possible, the moving body can, depending on the circumstances, be caused to travel without the supervising party remotely operating the moving body. This makes it possible to reduce the number of times the supervising party performs remote operations. This in turn makes it possible to reduce the burden on the supervising party in the remote location.

Additionally, for example, when the first operation is detected, a restriction on a travel state of the autonomous driving may be tightened in response to the execution condition being relaxed.

Through this, the restriction on the travel state of the moving body is tightened during a period of autonomous driving under the relaxed execution condition, which makes it possible to ensure the safety of the moving body during that period.

Additionally, for example, the travel state may include at least one of a speed, a steering angle, and an acceleration of the moving body, and a restriction on at least one of a maximum vehicle speed, a maximum steering angle, and a maximum acceleration during autonomous driving under the execution condition that has been relaxed may be tightened in response to the execution condition being relaxed.

Through this, the restriction on at least one of the maximum vehicle speed, the maximum steering angle, and the maximum acceleration of the moving body can be tightened during a period of autonomous driving under the relaxed execution condition, which makes it possible to ensure the safety of the moving body during that period.

Additionally, for example, when the first operation is detected, a supervision requirement on the supervising party supervising the moving body may be further tightened in response to the execution condition being relaxed.

Through this, the restriction on the supervision requirement for the supervising party is tightened during a period of autonomous driving under the relaxed execution condition, which makes it possible to ensure the safety of the moving body during that period.

Additionally, for example, the supervision requirement may include at least one of a supervised area and a supervised object, the supervised area being an area around the moving body required to be supervised by the supervising party, and the supervised object being an object required to be supervised by the supervising party, and tightening the supervision requirement may include intensifying supervising of at least one of the supervised area and the supervised object in response to the execution condition being relaxed.

Through this, the restriction on at least one of the supervised area and the supervised object for the supervising party can be tightened during a period of autonomous driving under the relaxed execution condition, which makes it possible to ensure the safety of the moving body during that period.

Additionally, for example, the supervision requirement may include an operation of the moving body required to be supervised by the supervising party, and tightening the supervision requirement may include adding supervising of a travel plan or travel control information of the moving body in response to the execution condition being relaxed.

Through this, the supervising party can be caused to closely supervise the behavior of the moving body during autonomous driving under the relaxed execution condition, which makes it easier to ensure the safety during that period.

Additionally, for example, the supervision requirement that has been tightened may be presented to the supervising party.

Through this, the supervising party can be made aware of the tightened supervision requirement. Accordingly, the safety can be ensured by causing the supervising party to perform supervision according to the supervision requirement. Additionally, if, for example, the tightened supervision requirement is presented before the first operation, the supervising party can determine whether to perform the first operation having confirmed the tightened supervision requirement.

Additionally, for example, the moving body may be caused to drive autonomously under the execution condition that has been relaxed only during supervising by the supervising party under the supervision requirement that has been tightened.

Through this, the supervising party performs supervision during a period of autonomous driving under the relaxed execution condition, which makes it possible to further ensure the safety of the moving body during that period. Additionally, because the supervising party is supervising the moving body, the supervising party can make the determination to switch to the remote operation mode for controlling the travel of the moving body smoothly in accordance with the circumstances of the travel of the moving body under the relaxed execution condition.

Additionally, for example, the supervising under the supervision requirement that has been tightened may correspond to a period in which a second operation by the supervising party is detected, the second operation indicating that the autonomous driving is to be continued under the execution condition that has been relaxed.

Through this, the moving body can be caused to drive autonomously under the relaxed execution condition only during a period where the supervising party is performing the second operation. In other words, the moving body can be caused to drive autonomously under the relaxed execution condition only during a period in which the supervising party determines to continue autonomous driving under the relaxed execution condition. Accordingly, a situation where autonomous driving under the relaxed execution condition is unnecessarily continued can be suppressed, which, for example, makes it possible to reduce the supervision burden resulting from the supervising party performing unnecessary supervision. This in turn makes it possible to further reduce the burden on the supervising party in the remote location. Additionally, because autonomous driving under the relaxed execution condition may result in reduced safety compared to normal autonomous driving, executing this only which the supervising party is performing the second operation makes it possible to ensure safety.

Additionally, for example, when the first operation is detected, a requirement for processing pertaining to supervising by the supervising party or for communication delay may be tightened in response to the execution condition being relaxed.

Through this, the restriction on requirements for processing pertaining to the supervising by the supervising party and communication delay can be tightened during a period of autonomous driving under the relaxed execution condition, which makes it possible to ensure the safety of the moving body during that period.

Additionally, an information processing system according to one aspect of the present disclosure includes: a detector that detects a first operation by a supervising party that supervises an autonomously-driving moving body from a remote location where the moving body cannot be supervised directly; and a mode changer that, when the first operation is detected, relaxes an execution condition for autonomous driving of the moving body more than an execution condition applied when the first operation is not detected, and causes the moving body to drive autonomously under the execution condition that has been relaxed.

Through this, the same effects as those of the above-described information processing method can be achieved.

Furthermore, these comprehensive or specific aspects of the present disclosure may be realized by a system, a device, a method, an integrated circuit, a computer program, or a non-transitory computer-readable recording medium such as a CD-ROM, or may be implemented by any desired combination of systems, devices, methods, integrated circuits, computer programs, and recording media.

Specific examples of the information processing method and the information processing system according to aspects of the present disclosure will be described hereinafter with reference to the drawings. Each of the following embodiments describes a specific example of the present disclosure. Accordingly, the numerical values, shapes, constituent elements, steps, orders of steps, and the like in the following embodiments are merely examples, and are not intended to limit the present disclosure. Additionally, of the constituent elements in the following embodiments, constituent elements not denoted in the independent claims will be described as optional constituent elements. Additionally, in all of the embodiments, individual details can be combined.

Additionally, the drawings are schematic diagrams, and are not necessarily exact illustrations. As such, the scales and so on, for example, are not necessarily consistent from drawing to drawing. Furthermore, configurations that are substantially the same are given the same reference signs in the drawings, and redundant descriptions will be omitted or simplified.

Additionally, in the present specification, numerical values and numerical value ranges do not express the items in question in the strictest sense, and also include substantially equivalent ranges, e.g., differences of several percent, as well.

Embodiment

An information processing method and the like according to the present embodiment will be described hereinafter with reference to FIGS. 1 to 32C.

1. Configuration of Vehicle Control System

The configuration of vehicle control system 10 according to the present embodiment will be described next with reference to FIGS. 1 and 2. FIG. 1 is a diagram illustrating the overall configuration of vehicle control system 10 according to the present embodiment.

As illustrated in FIG. 1, vehicle control system 10 includes remote operation system 100, network 300, wireless base station 310, and vehicle 200. Vehicle control system 10 is a system that communicably connects vehicle 200 and remote operation system 100 (and specifically, remote operation device 130) via wireless base station 310 and network 300, which are a wireless LAN, a communication terminal, and the like. Wireless base station 310 and network 300 are an example of a communication network. Additionally, vehicle 200 is an example of a moving body that is at least remotely supervised by remote operating party H. Vehicle 200 may be a vehicle that is remotely supervised and remotely operated by remote operating party H. Note that vehicle control system 10 is an example of an information processing system. Additionally, remote operating party H is an example of a supervising party that supervises vehicle 200, which drives autonomously, from a remote location from which vehicle 200 cannot be supervised directly. "Cannot be supervised directly" means that vehicle 200 cannot be seen by the naked eye. In other words, remote operating party H remotely supervises and remotely operates vehicle 200 from a location different from the surroundings of vehicle 200.

Remote operation system 100 is a system for remote operating party H, who is in a remote location, to remotely supervise and remotely operate the travel of vehicle 200 as necessary. Remote operation system 100 includes display device 110, operation input device 120, and remote operation device 130.

Display device 110 displays various types of information to remote operating party H. Display device 110 is a monitor which is connected to remote operation device 130 and which displays information pertaining to vehicle 200. Display device 110 displays information for remote operating party H to remotely supervise or remotely operate the travel of vehicle 200. Display device 110 displays images captured by an imager included in vehicle 200, for example. Display device 110 also displays information processed by remote operation device 130. Display device 110 may also display a button (an image) or the like for remote operating party H to switch a travel mode of vehicle 200 or to perform an operation for maintaining the travel mode. Display device 110 displays, for example, information such as a supervised area and the like required to be supervised by remote operating party H. The information displayed by display device 110 will be described in detail later.

Display device 110 is implemented by a liquid crystal display or the like, for example.

Operation input device 120 accepts various types of operations from remote operating party H. Operation input device 120 accepts the input of travel permission commands from remote operating party H when traveling in an ODD relaxed travel mode in which the ODD is relaxed more than in an autonomous travel mode (autonomous driving mode). A "travel permission command" is a command that permits vehicle 200 to continue traveling in the ODD relaxed travel mode. Operation input device 120 is implemented by, for example, a touch panel or the like, but may also be implemented by hardware keys (hardware buttons), slide switches, or the like. Operation input device 120 may also accept various types of input through information based on the voice, gestures, line of sight, or the like of remote operating party H. Operation input device 120 may also accept inputs made by swiping, the input of a destination, and the like.

Operation input device 120 also accepts the input of remote operations from remote operating party H when traveling in the remote operation mode. Operation input device 120 is, for example, a steering wheel, foot pedals (e.g., an accelerator pedal and a brake pedal), and the like, but may also be implemented by a joystick or the like.

Although the ODD relaxed travel mode and the remote operation mode will be described later, these modes are characterized in that vehicle 200 can travel in the ODD relaxed travel mode.

Remote operation device 130 executes processing for switching the travel mode of vehicle 200 when vehicle 200 cannot drive autonomously. Remote operation device 130 reduces the burden on remote operating party H by reducing the frequency with which remote operating party H performs remote operations, even when vehicle 200 cannot drive autonomously. Specifically, remote operation device 130 switches the travel mode to the ODD relaxed travel mode, which corresponds to a level between autonomous driving level 4, where vehicle 200 drives completely autonomously, and autonomous driving level 1, where remote operating party H operates vehicle 200 remotely, and continues the autonomous travel of vehicle 200 in the ODD relaxed travel mode to which the mode was switched. Remote operation device 130 may enable remote operations by remote operating party H when the travel mode cannot be switched to the ODD relaxed travel mode.

In this manner, remote operation device 130 has the ODD relaxed travel mode in addition to the autonomous travel mode and the remote operation mode, which are conventionally available travel modes. The ODD relaxed travel mode is a mode in which vehicle 200 is caused to drive autonomously by relaxing the ODD conditions. The ODD relaxed travel mode can also be called a mode in which remote operating party H does not operate vehicle 200 remotely. During the ODD relaxed travel mode, remote operating party H remotely supervises vehicle 200 based on, for example, an image obtained from vehicle 200. In other words, vehicle 200 continues traveling autonomously based on the ODD having relaxed conditions, while being remotely supervised by remote operating party H. This makes it possible to reduce the frequency with which the vehicle enters autonomous driving level 1, in which the vehicle is remotely operated by remote operating party H, and thus the burden on remote operating party H can be reduced. As such, remote operation device 130 also functions as a remote supervision device.

In the present embodiment, remote operation device 130 furthermore imposes constraints on vehicle 200 during travel in the ODD relaxed travel mode. Remote operation device 130 can also be said to make the constraints stricter in the ODD relaxed travel mode than in the autonomous travel mode. "Constraints" are criteria for determining whether it is acceptable for vehicle 200 to continue traveling in the ODD relaxed travel mode. By imposing constraints, remote operation device 130 can cause vehicle 200 to travel more safely. This makes it possible for remote operation device 130 to cause the vehicle to, for example, safely and autonomously travel a path that cannot be traveled at autonomous driving level 4, which is fully autonomous driving, by having remote operating party H supervise remotely and imposing constraints.

Note that the "autonomous driving levels" are defined as follows in the present specification.

Autonomous driving level 1 is a level in which the operation of at least one of the accelerator (acceleration), the steering wheel (steering angle), and the brakes (braking) is performed automatically. Autonomous driving level 2 is a level at which the operations of several of the accelerator, the steering wheel, and the brakes are performed automatically. Autonomous driving level 3 is a level at which the operations of all of the accelerator, the steering wheel, and the brakes are performed automatically, and the driver takes over only when necessary. Autonomous driving level 4 is a level at which the operations of all of the accelerator, the steering wheel, and the brakes are performed automatically, and the driver does not participate in the driving. Autonomous driving level 4 is also a level which does not require remote supervision by, for example, remote operating party H. Autonomous driving level 3 is a level at which, for example, the driver is obligated to supervise the driving, whereas autonomous driving level 4 is a level at which, for example, the driver is not obligated to supervise the driving. Autonomous driving levels 3 and 4 are levels at which the vehicle can drive autonomously to a destination without requiring operations from the driver. Note, however, that the autonomous driving levels are not limited to the four described above, and 5 levels may be defined instead, for example.

Vehicle 200 is an example of a moving body occupied by people including a driver, and which is remotely supervised or remotely operated by remote operating party H as necessary. Vehicle 200 is a self-driving vehicle. Vehicle 200 may be a self-driving vehicle capable of switching between autonomous driving and manual driving. Note that "self-driving vehicle" may be any vehicle which can be occupied by a person and is capable of driving autonomously, and may be a bus capable of driving autonomously, a taxi capable of driving autonomously, a passenger car capable of driving autonomously, a truck capable of driving autonomously, a construction vehicle (e.g., a dump truck) capable of driving autonomously, or the like.

The configurations of remote operation device 130 and vehicle 200 will be described with reference to FIG. 2. FIG. 2 is a block diagram illustrating the functional configuration of vehicle control system 10 according to the present embodiment. In FIG. 2, only remote operation device 130 and vehicle 200 are illustrated, among the constituent elements of vehicle control system 10.

Figure 2:
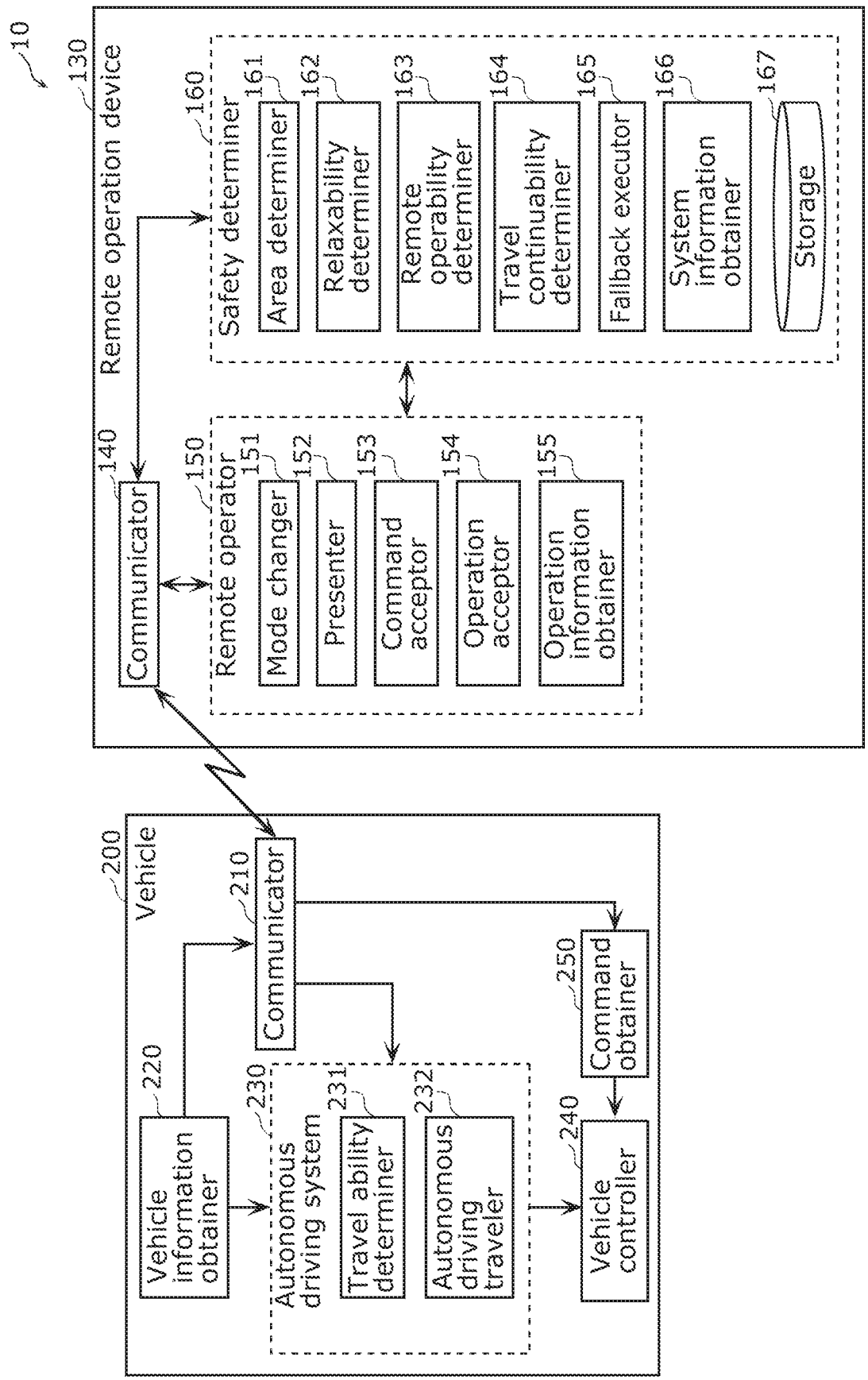
FIG. 2 is a block diagram illustrating the functional configuration of the vehicle control system according to the embodiment.

As illustrated in FIG. 2, remote operation device 130 includes communicator 140, remote operator 150, and safety determiner 160.

Communicator 140 communicates with vehicle 200 via network 300 and wireless base station 310. For example, communicator 140 obtains vehicle information from vehicle 200, and outputs information for changing the travel mode to vehicle 200. Communicator 140 is implemented by, for example, a communication circuit (communication module).

Remote operator 150 executes processing pertaining to switching of the travel mode of vehicle 200. Remote operator 150 includes mode changer 151, presenter 152, command acceptor 153, operation acceptor 154, and operation information obtainer 155.

Mode changer 151 switches the travel mode of vehicle 200. Mode changer 151 outputs information for switching the travel mode of vehicle 200 to vehicle 200 via communicator 140. Mode changer 151 switches the travel mode of vehicle 200 from the current travel mode to one travel mode among an autonomous driving mode (e.g., a fully autonomous driving mode), the ODD relaxed travel mode, and the remote operation mode. Mode changer 151 switches to one of the ODD relaxed travel mode and the remote operation mode if the vehicle can no longer travel in an autonomous driving mode. Note that mode changer 151 switches the travel mode by, for example, accepting an operating indicating that switching the travel mode is permitted from remote operating party H.

Mode changer 151 changes the ODD conditions of vehicle 200 according to the travel mode after the switch.

Mode changer 151 may furthermore execute processing for ensuring the safety of vehicle 200 as the ODD is changed if the travel mode of vehicle 200 has been switched to the ODD relaxed travel mode. Mode changer 151 may, for example, change settings pertaining to a determination as to whether travel is possible, made by travel ability determiner 231 of vehicle 200, based on constraints of relaxability determiner 162 or remote operability determiner 163. The settings pertaining to the determination as to whether travel is possible include at least one of, for example, a maximum vehicle speed, a maximum steering angle, a maximum acceleration, and the like. When switching from the autonomous driving mode to the ODD relaxed travel mode, mode changer 151 may change (switch) the settings pertaining to the determination as to whether travel is possible based on the constraints of the ODD relaxed travel mode. Mode changer 151 may reduce at least one of the maximum vehicle speed, the maximum steering angle, the maximum acceleration, and the like used in the determination as to whether travel is possible made by travel ability determiner 231, for example. It can be said that when switching from the autonomous driving mode to the ODD relaxed travel mode, mode changer 151 applies a stricter restriction to at least one of the maximum vehicle speed, the maximum steering angle, the maximum acceleration, and the like than when in the autonomous driving mode. Mode changer 151 changes the settings pertaining to the determination as to whether travel is possible made by travel ability determiner 231 each time the travel mode of vehicle 200 switches, for example.

In this manner, mode changer 151 may change the travel mode of vehicle 200 to the ODD relaxed travel mode, in which the constraints are restricted, rather than relaxing the ODD. This makes it possible for remote operation device 130 to continue autonomous travel while ensuring a minimum level of safety on the vehicle 200 side in the ODD relaxed travel mode.

Mode changer 151 also outputs ODD changes and constraints to area determiner 161 and travel continuability determiner 164, for example. Mode changer 151 may also enable operation acceptor 154 to accept operations when the mode has been switched to the ODD relaxed travel mode, for example.

Note that the speed, steering angle, and acceleration of vehicle 200 are examples of autonomous driving travel states. It is acceptable for the travel state to include at least one of the speed, steering angle, and acceleration of vehicle 200.

Presenter 152 causes display device 110 to perform a predetermined presentation. For example, presenter 152 generates information to be presented for remote operating party H to remotely supervise or remotely operate the travel of vehicle 200. Additionally, presenter 152 may cause display device 110 to display an image captured by the imager included in vehicle 200 superimposed with predetermined information (e.g., auxiliary information or the like, which will be described later). Presenter 152 may also cause display device 110 to present information processed by remote operation device 130. Presenter 152 may also cause display device 110 to present a button or the like for remote operating party H to switch a travel mode of vehicle 200 or to perform an operation for maintaining the travel mode.

Command acceptor 153 accepts, from operation input device 120 (e.g., a touch panel), information (e.g., a command) corresponding to an operation input to operation input device 120 by remote operating party H during travel in the ODD relaxed travel mode. Command acceptor 153 is an example of a detector.

Operation acceptor 154 accepts, from operation input device 120 (e.g., the steering wheel, a foot pedal, or the like), information corresponding to an operation input to operation input device 120 by remote operating party H during the remote operation mode.

Operation information obtainer 155 obtains information pertaining to remote operation system 100, information pertaining to remote operating party H, and the like. The information pertaining to remote operating party H is a level of proficiency, permissions, and the like of remote operating party H during remote operation.

Operation information obtainer 155 reads out the information pertaining to remote operating party H from storage 167, for example. The information pertaining to remote operating party H may include a supervision result, which is a result of remote operating party H supervising the current state. The "current state" is information through which it can be determined whether remote operating party H can perform required supervision, and includes, for example, at least one of being asleep or not, a concentration level, and a fatigue level. Operation information obtainer 155 may obtain the supervision result of the current state of remote operating party H by, for example, obtaining an image captured of remote operating party H and performing image analysis on the image.

Safety determiner 160 executes processing pertaining to the safety of travel of vehicle 200 in vehicle control system 10. Safety determiner 160 executes processing for ensuring safety during travel in the ODD relaxed travel mode, for example. For example, while vehicle 200 is traveling in the ODD relaxed travel mode, safety determiner 160 executes processing of supervising vehicle 200, remote operating party H, and remote operation system 100, and when a predetermined condition (e.g., a constraint) is satisfied, stopping vehicle 200 because the safety has decreased.

Safety determiner 160 includes area determiner 161, relaxability determiner 162, remote operability determiner 163, travel continuability determiner 164, fallback executor 165, system information obtainer 166, and storage 167.

Area determiner 161 calculates an area that is to be supervised by remote operating party H during travel in the ODD relaxed travel mode or the remote operation mode, based on supervision required area information from mode changer 151 and the vehicle information obtained from vehicle 200.

Relaxability determiner 162 determines whether it is acceptable to switch to the ODD relaxed travel mode when switching the travel mode. For example, relaxability determiner 162 calculates constraints when traveling in the ODD relaxed travel mode, and makes the above-described determination based on whether the current situation satisfies the constraints. The constraints include at least one of the maximum vehicle speed, the maximum steering angle, the communication delay, and the supervision required area. Note that the "communication delay" is communication delay between vehicle 200 and remote operation device 130. The supervision required area is an area which is required to be supervised by remote operating party H for vehicle 200 to travel autonomously, and is an area around vehicle 200. The supervised area supervised by remote operating party H is an example of a supervision requirement of a supervising party. Note that the supervision requirement may include a remote supervision required object, which is an object which is required to be supervised by remote operating party H. The remote supervision required object is an example of a supervised object. Additionally, the "current situation" includes at least one of the situation of vehicle 200, the situation of remote operating party H, and the situation of the system.

Remote operability determiner 163 determines whether it is acceptable to switch to the remote operation mode when switching the travel mode. For example, remote operability determiner 163 calculates constraints when traveling in the remote operation mode, and makes the above-described determination based on whether the current situation satisfies the constraints.

Travel continuability determiner 164 determines whether the constraints in the current travel mode are satisfied while vehicle 200 is traveling. If the current travel mode is the ODD relaxed travel mode, travel continuability determiner 164 determines, while vehicle 200 is traveling, whether the constraints defined by relaxability determiner 162 are satisfied. On the other hand, if the current travel mode is the remote operation mode, travel continuability determiner 164 determines, while vehicle 200 is traveling, whether the constraints defined by remote operability determiner 163 are satisfied.

Fallback executor 165 controls the travel of vehicle 200 based on a result of the determination by travel continuability determiner 164. If travel continuability determiner 164 determines that the constraints in the travel mode are not satisfied, fallback executor 165 performs a fallback for the travel of vehicle 200. The "fallback" is, for example, stopping travel, restricting travel, forced mode switching, and the like. When travel continuability determiner 164 determines that the constraints in the travel mode are not satisfied, fallback executor 165 executes one of stopping the travel of vehicle 200, further restricting the travel conditions of vehicle 200, or forcibly switching the travel mode. For example, if travel continuability determiner 164 determines that the constraints in the travel mode are not satisfied, fallback executor 165 may perform an emergency stop of vehicle 200.

System information obtainer 166 obtains various types of information pertaining to vehicle control system 10. System information obtainer 166 obtains specification information of remote operation system 100 (e.g., the first system information illustrated in FIG. 13 and described later), and information indicating the current soundness of vehicle control system 10, such as a network state including communication delay and communication bandwidth, computational resources of remote operation device 130, the operating states of programs, and the like (e.g., the second system information illustrated in FIG. 18 and described later). System information obtainer 166 may store the obtained information in storage 167.

Storage 167 stores data pertaining to vehicle 200 and remote operation for each of the autonomous travel mode, the relaxed travel mode, and the remote operation mode (ODD, constraints, and the like; see FIGS. 9 and 10, for example (described later)). Storage 167 stores a set of ODD and constraints corresponding to each of a plurality of relaxed travel modes, for example. Storage 167 can also be said to store a set of conditions under which autonomous travel is possible and constraints under those conditions. Storage 167 is realized by semiconductor memory or the like, for example, but is not limited thereto.

Vehicle 200 includes communicator 210, vehicle information obtainer 220, autonomous driving system 230, vehicle controller 240, and command obtainer 250.

Communicator 210 communicates with remote operation device 130 via network 300 and wireless base station 310. For example, communicator 210 outputs the vehicle information to remote operation device 130, and obtains information for changing the travel mode from remote operation device 130. Communicator 210 is implemented by, for example, a communication circuit (communication module).

Vehicle information obtainer 220 obtains the vehicle information of vehicle 200. The vehicle information includes at least one of specification information of vehicle 200; the current vehicle speed, steering angle, and acceleration; autonomous driving travel path information; ODD relaxed travel mode travel path information; and sensing information. The specification information includes at least one of the size of vehicle 200, the wheelbase, the maximum steering angle, the maximum vehicle speed, the maximum acceleration, the maximum deceleration, and obstacle detection ability. The sensing information includes at least one of the current position of vehicle 200, information pertaining to surrounding objects, and information indicating the state of the vehicle interior.

Vehicle information obtainer 220 may obtain the vehicle information from an outside device (e.g., a server device that manages the specification information of vehicle 200), or may obtain the vehicle information based on sensing information from various types of sensors.

Autonomous driving system 230 executes processing for vehicle 200 to drive autonomously according to the travel mode of vehicle 200. Autonomous driving system 230 includes travel ability determiner 231 and autonomous driving traveler 232.

Travel ability determiner 231 determines whether travel is possible in the autonomous travel mode and whether travel is possible in the ODD relaxed travel mode. Travel ability determiner 231 determines whether travel is possible in the autonomous travel mode and whether travel is possible in the ODD relaxed travel mode based on the set ODD and the vehicle information. Travel ability determiner 231 makes the determination repeatedly at predetermined time intervals during travel in the autonomous travel mode and the ODD relaxed travel mode.

Autonomous driving traveler 232 generates an autonomous driving travel plan based on the vehicle information. The travel plan includes a travel path, a speed, and the like. Additionally, if the result of the determination by travel continuability determiner 164 indicates that travel can be continued, autonomous driving traveler 232 outputs control information based on the travel plan to vehicle controller 240 in order to execute the generated travel plan. The control information based on the travel plan is an example of travel control information.

Vehicle controller 240 controls the travel of vehicle 200 based on the autonomous driving travel plan or remote operation control commands.

Command obtainer 250 obtains various types of commands from remote operation device 130 via communicator 210, generates commands for controlling vehicle 200 according to the obtained commands, and outputs the generated commands to vehicle controller 240. If vehicle 200 is traveling in the ODD relaxed travel mode, command obtainer 250 obtains, from remote operation device 130, information indicating that travel is permitted to continue in the ODD relaxed travel mode (a travel continuation command). For example, command obtainer 250 obtains the information periodically. Upon obtaining the information, command obtainer 250 outputs a command to vehicle controller 240 indicating that the ODD relaxed travel mode is to be continued. Note that command obtainer 250 may stop the travel of vehicle 200 if a travel continuation command is not obtained for a predetermined period, if the travel continuation command is significantly delayed (e.g., there is a high level of communication network delay), or if information indicating the ODD relaxed travel mode is to be ended is obtained.

Additionally, when vehicle 200 is traveling in the remote operation mode, command obtainer 250 obtains a remote operation command generated by remote operating party H operating operation acceptor 154, generates a travel control command for vehicle 200 based on the obtained remote operation command, and outputs the generated command to vehicle controller 240.

2. Operations of Vehicle Control System

Figure 3:
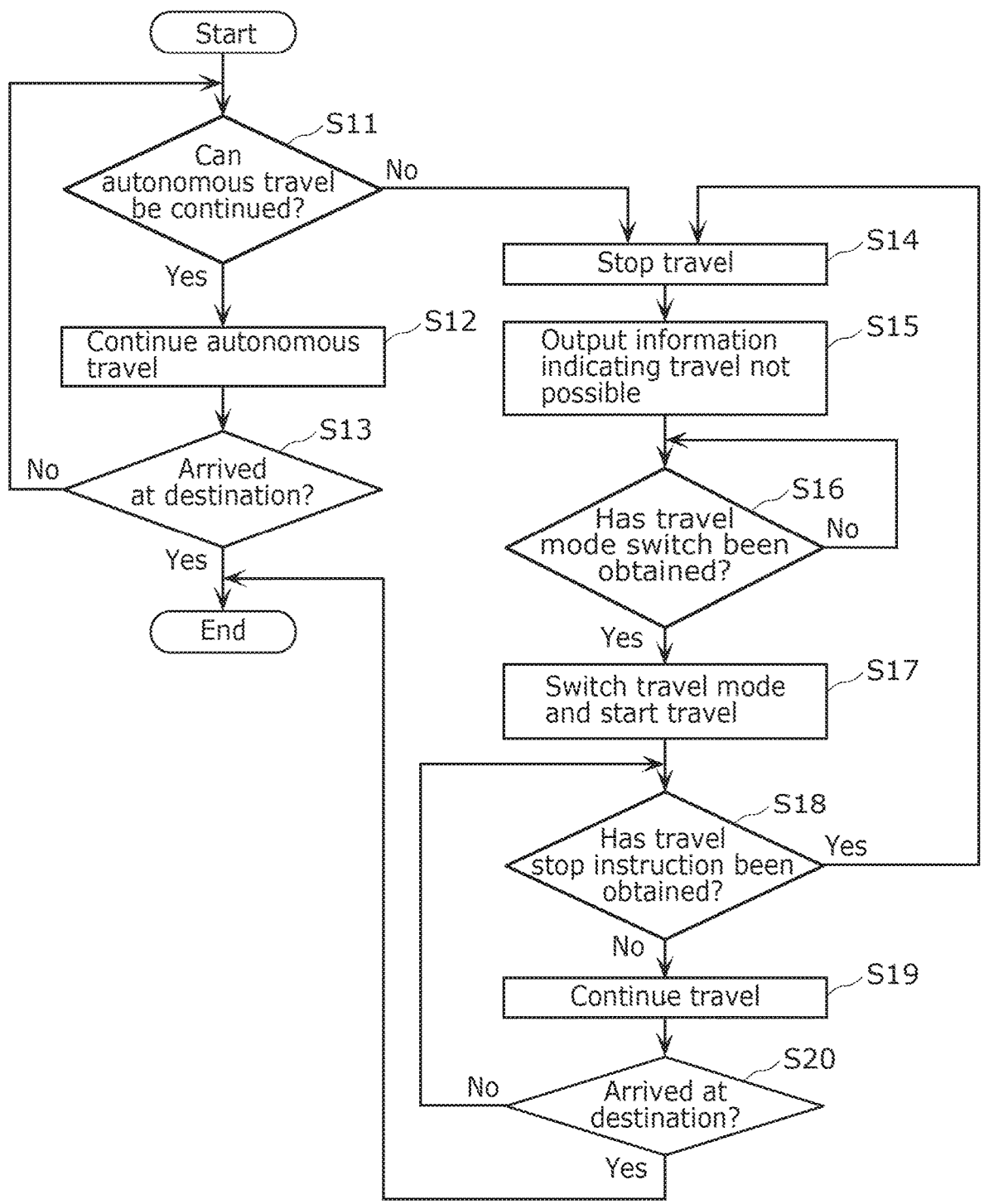
FIG. 3 is a flowchart illustrating operations of a vehicle according to the embodiment.

Operations of vehicle control system 10 described above will be described next with reference to FIGS. 3 to 22. FIG. 3 is a flowchart illustrating operations of vehicle 200 according to the present embodiment. FIG. 3 illustrates operations performed when vehicle 200 is traveling in the autonomous driving mode.

As illustrated in FIG. 3, travel ability determiner 231 determines whether autonomous travel can be continued (S11). Travel ability determiner 231 determines whether travel in the autonomous travel mode can be continued based on the ODD corresponding to the autonomous travel mode and the vehicle information, for example.

If travel ability determiner 231 determines that the autonomous travel can be continued (Yes in S11), the autonomous travel is continued (S12). Specifically, travel ability determiner 231 outputs information indicating that autonomous driving is to be continued to autonomous driving traveler 232.

Travel ability determiner 231 determines whether a destination has been arrived at (S13). Travel ability determiner 231 may determine whether the destination has been arrived at based on the current position of vehicle 200, for example.

Travel ability determiner 231 may obtain the current position of vehicle 200 from outside via communicator 210, or may obtain the current position of vehicle 200 based on a Global Positioning System (GPS) signal (i.e., radio waves transmitted from a satellite). Travel ability determiner 231 is configured including a GPS module that obtains the current position by measuring the current position of vehicle 200 based on a GPS signal. Note that the destination is obtained in advance.

If the destination has been arrived at (Yes in S13), travel ability determiner 231 ends the travel of vehicle 200. On the other hand, if the destination has not been arrived at (No in S13), travel ability determiner 231 returns to step S11 and continues the travel.

If the autonomous travel cannot be continued (No in S11), travel ability determiner 231 stops the travel of vehicle 200 (S14). Then, travel ability determiner 231 outputs information indicating that travel is not possible (autonomous travel is not possible) to remote operation device 130 via communicator 210 (S15).

Next, upon obtaining the information indicating that travel is not possible from vehicle 200, remote operation device 130 executes processing for switching the travel mode. The processing for switching the travel mode by remote operation device 130 will be described later. Once the post-switch travel mode is determined, remote operation device 130 outputs information indicating the travel mode is to be switched to vehicle 200. The following will describe an example in which the post-switch travel mode is the ODD relaxed travel mode.

Next, if a travel mode switch to the ODD relaxed travel mode has been obtained (Yes in S16), autonomous driving traveler 232 switches the travel mode to the ODD relaxed travel mode and starts travel (S17). Specifically, autonomous driving traveler 232 generates a travel plan in the ODD relaxed travel mode, and outputs commands for executing the generated travel plan to vehicle controller 240.

Next, command obtainer 250 determines whether an instruction to stop the travel has been obtained from remote operation device 130 (S18). In the present embodiment, command obtainer 250 obtains a command permitting travel in the ODD relaxed travel mode to be continued (also called a "travel continuation command" hereinafter) while traveling in the ODD relaxed travel mode, e.g., periodically. Command obtainer 250 may make a determination of "Yes" in step S18 when, for example, the travel continuation command is not obtained for a predetermined period, the travel continuation command is significantly delayed, or information indicating the ODD relaxed travel mode is to be ended is obtained. The travel continuation command not being obtained for a predetermined period and the information indicating the ODD relaxed travel mode is to be ended are examples of an instruction to stop travel.

If command obtainer 250 has received an instruction to stop travel from remote operation device 130 (Yes in S18), vehicle controller 240 returns to step S14 and continues the subsequent processing. However, if command obtainer 250 has not obtained an instruction to stop travel from remote operation device 130 (No in S18), vehicle controller 240 continues the travel in the ODD relaxed travel mode (S19).

Next, travel ability determiner 231 determines whether the destination has been arrived at (S20). The determination processing in step S20 is similar to step S13 and will therefore not be described. Note that if a determination of "No" is made in step S20, the processing returns to step S18 and is continued.

Figure 4:
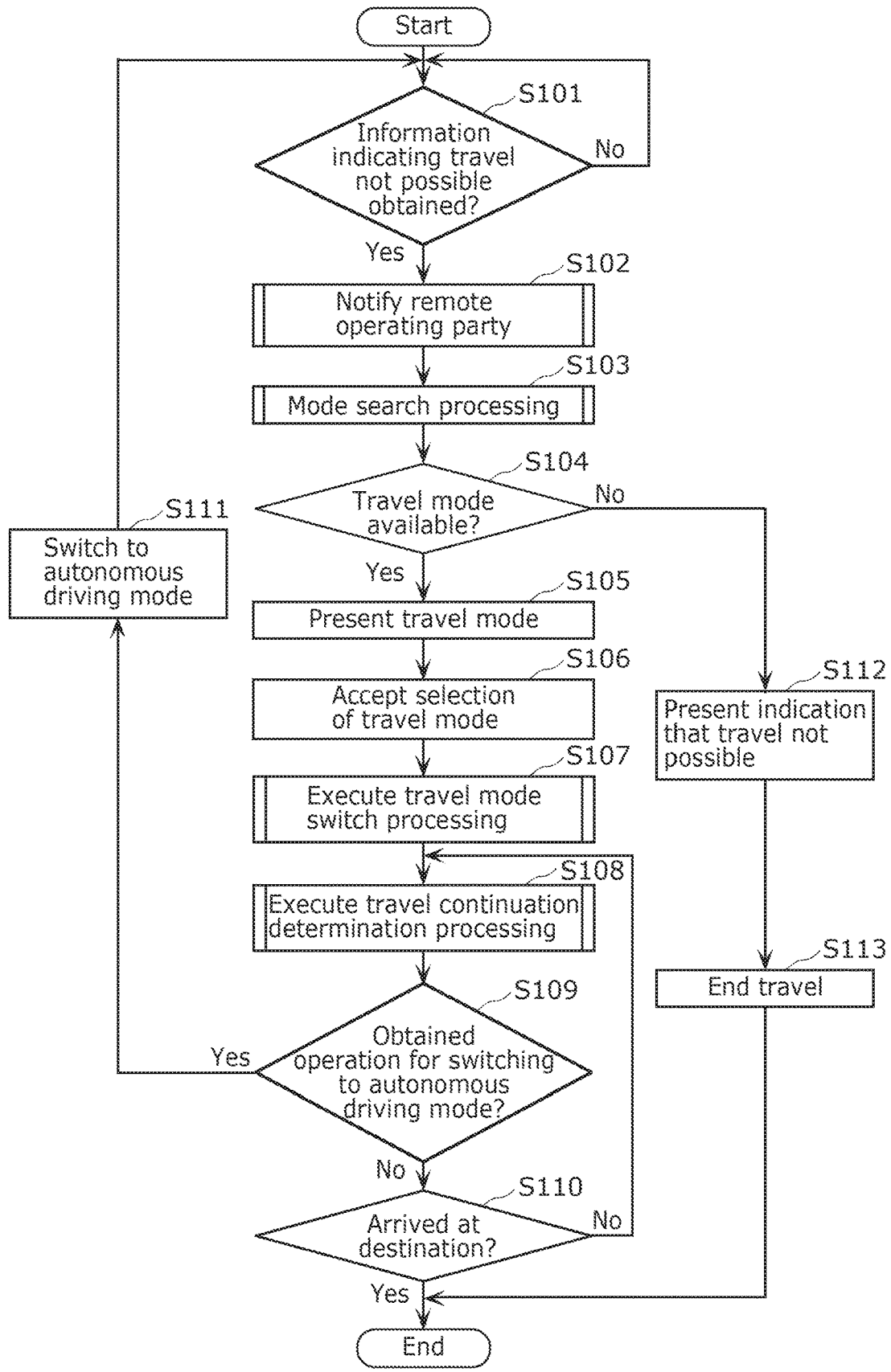
FIG. 4 is a flowchart illustrating operations of a remote operation device according to the embodiment.

Operations of remote operation device 130 will be described next. FIG. 4 is a flowchart illustrating operations of remote operation device 130 according to the present embodiment.

As illustrated in FIG. 4, upon obtaining information indicating that travel is not possible (autonomous travel is not possible) from vehicle 200 via communicator 140 (Yes in S101), presenter 152 notifies remote operating party H (S102). Presenter 152 notifies remote operating party H by, for example, presenting (displaying, in the present embodiment) the information obtained in step S101 in display device 110. Note that the form in which presenter 152 presents the information to remote operating party H is not particularly limited.

Figures 5, 6:
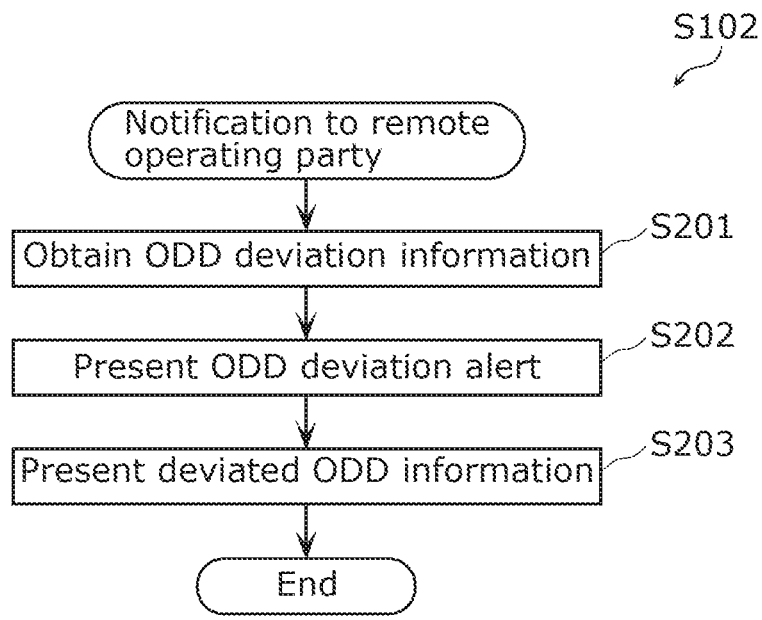
FIG. 5 is a flowchart illustrating operations for notifying a remote operating party, indicated in step S102 of FIG. 4.
FIG. 6 is a diagram illustrating an example of second vehicle information.

The processing for notifying remote operating party H will be described here with reference to FIG. 5. FIG. 5 is a flowchart illustrating operations for notifying remote operating party H, indicated in step S102 of FIG. 4.

As illustrated in FIG. 5, first, presenter 152 obtains ODD deviation information (S201). Presenter 152 may obtain the ODD deviation information by obtaining the second vehicle information, including the ODD deviation information, from vehicle 200, for example. FIG. 6 is a diagram illustrating an example of the second vehicle information. Remote operation device 130 sequentially obtains the second vehicle information from vehicle 200.

As illustrated in FIG. 6, the second vehicle information is information indicating the current state of vehicle 200, and is output from vehicle 200 to remote operation device 130 at predetermined time intervals. The second vehicle information includes the current vehicle speed, the current steering angle, the travel mode, a travel state, and the ODD deviation information. The second vehicle information may also include the current acceleration. The travel mode is the autonomous driving mode, but the travel state is "stopped". The ODD deviation information indicates that travel in the opposite lane is required. In other words, vehicle 200 is in a situation where there is an obstacle or the like in front and travel in the opposite lane is required, but traveling in the opposite lane deviates from the ODD and autonomous travel therefore cannot be continued.

Note that presenter 152 may obtain the ODD deviation information separate from the second vehicle information.

Figure 7:
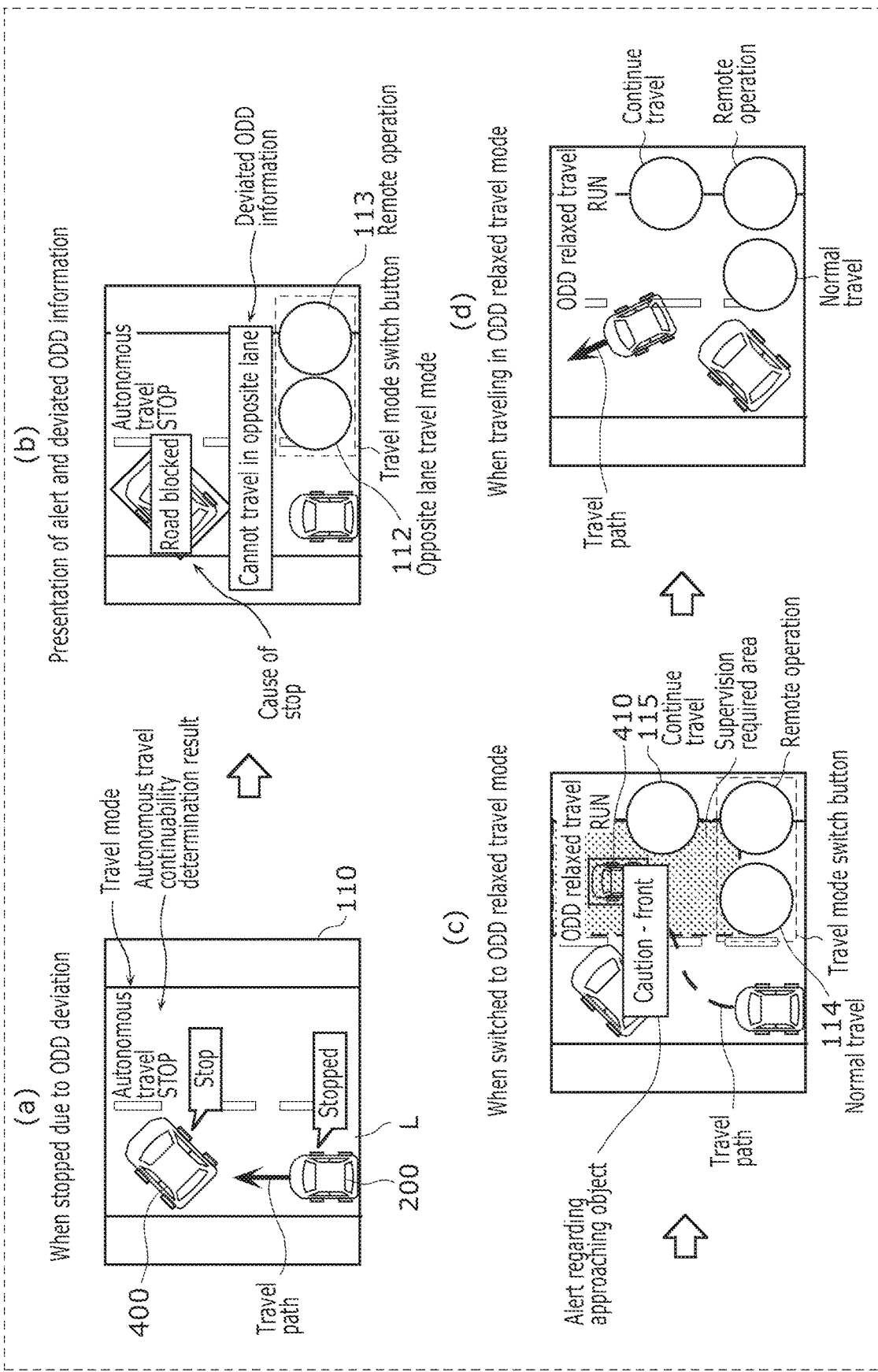
FIG. 7 is a schematic diagram illustrating a switch to an ODD relaxed travel mode.

FIG. 7 is a schematic diagram illustrating a switch to the ODD relaxed travel mode. (a) in FIG. 7 indicates a state in which vehicle 200 has deviated from the ODD and has therefore stopped. Note that the arrow from vehicle 200 indicates the travel path. Although FIG. 7 illustrates overhead images, the image presented by presenter 152 is not limited to an overhead image. If vehicle 200 is equipped with a surround view system, presenter 152 can present an overhead image in display device 110.

(a) in FIG. 7 indicates a state in which vehicle 400 is stopped in front of vehicle 200 traveling on road L, and an image indicating vehicle 200 in a stopped state is present in display device 110. The current travel mode of vehicle 200 and a result of determining whether vehicle 200 can continue autonomous travel may also be presented in the image. The travel mode is autonomous travel, and the result of determining whether autonomous travel can be continued is "STOP" (autonomous travel is not possible). Vehicle 400 is blocking road L, and the ODD of vehicle 200 includes only own lane travel, among own lane travel and opposite lane travel, being possible. As such, vehicle 200 cannot travel through the opposite lane to avoid vehicle 400. Note that the state indicated in (a) of FIG. 7 may be presented to remote operating party H by display device 110.

Referring again to FIG. 5, presenter 152 presents an ODD deviation alert (S202). In other words, presenter 152 presents information indicating that vehicle 200 has deviated from the ODD in display device 110. Next, presenter 152 presents deviated ODD information (S203). Through steps S202 and S203, remote operating party H can know the ODD deviation alert and the deviated ODD information, and thus remote operating party H can perform the remote supervision or remote operation of vehicle 200 smoothly.

(b) in FIG. 7 indicates a state in which an image indicating a state in which the ODD deviation alert and the deviated ODD information are presented is presented by presenter 152. This image includes vehicle 400 as being the reason vehicle 200 has stopped, the deviated ODD information, the current travel mode, the result of determining whether autonomous travel can be continued, and a switch button for switching the travel mode. Presenting the reason why vehicle 200 cannot travel autonomously to remote operating party H makes it possible for remote operating party H to appropriately recognize the situation of vehicle 200. Note that the reason for the stop, the deviated ODD information, the result of determining whether autonomous travel can be continued, or the like is presented as the ODD deviation alert.

The switch button includes, for example, button 112 indicating an "opposite lane travel mode", and button 113 indicating "remote operation" (these are what are known as "software buttons"). Here, the opposite lane travel mode is an example of the ODD relaxed travel mode, and is a travel mode in which the ODD is relaxed and restrictions such as constraints are tightened. "Remote operation" means the remote operation mode. Note that if the switch button is a hardware button, the switch button need not be presented in display device 110.

Remote operating party H can easily recognize the situation of the stopped vehicle 200 simply by looking at the image indicated in (b) of FIG. 7.

Referring again to FIG. 4, next, mode changer 151 executes the mode search processing (S103). It can be said that because travel in the autonomous driving mode is not possible, mode changer 151 determines whether there is a travel mode to which the mode can be switched. Mode changer 151 determines whether there is an ODD relaxed travel mode or a remote operation mode to which the mode can be switched.

Figure 8:
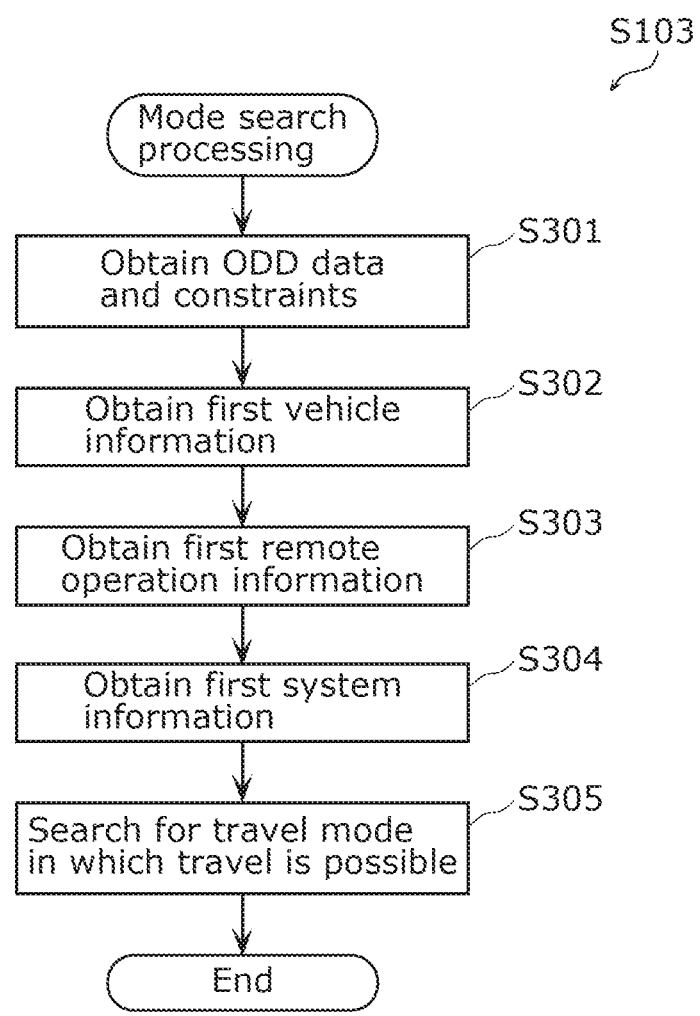
FIG. 8 is a flowchart illustrating operations in mode search processing, indicated in step S103 of FIG. 4.

Here, the mode search processing will be described with reference to FIGS. 8 to 13. FIG. 8 is a flowchart illustrating operations in the mode search processing, indicated in step S103 of FIG. 4.

Mode changer 151 obtains the ODD data and the constraints (S301). Mode changer 151 obtains the ODD data and the constraint for when in the ODD relaxed travel mode from storage 167. In the example in FIG. 7, mode changer 151 obtains the ODD data and the constraints for the opposite lane travel mode. The "opposite lane travel mode" is, for example, a travel mode in which a travelable area in the ODD of vehicle 200 includes the opposite lane. If, for example, a plurality of ODD relaxed travel modes are stored in storage 167, mode changer 151 may extract at least one ODD relaxed travel mode in which the travelable area in the ODD includes the opposite lane (an example of an ODD relaxed travel mode that can be switched to).

Examples of the ODD data and the constraints will be described here with reference to FIGS. 9 and 10. FIG. 9 is a diagram illustrating an example of the ODD data. FIG. 9 illustrates the ODD data in the opposite lane travel mode (the ODD relaxed travel mode). FIG. 10 is a diagram illustrating an example of the constraints. The constraints illustrated in FIG. 10 are constraints corresponding to the ODD data illustrated in FIG. 9.

(a) in FIG. 9 indicates the travelable area, and in the opposite lane travel mode, the travelable area is the own lane and the opposite lane. (b) in FIG. 9 indicates objects to be passed, and in the opposite lane travel mode, the objects to be passed are vehicles (on the shoulder), color cones (registered trademark), and vehicles (traveling in front). Note that in the ODD data for the autonomous travel mode, for example, the travel area is only the own lane, and the objects to be passed are only vehicles (on the shoulder) and color cones (registered trademark). In other words, the ODD data illustrated in FIG. 9 adds the opposite lane to the travelable area and vehicles (traveling in front) to the objects to be passed in the ODD data for the autonomous travel mode. This is an example of the ODD being relaxed.

(a) in FIG. 10 indicates the vehicle conditions, and in the opposite lane travel mode, the vehicle conditions are a maximum vehicle speed of 10 km/h, a maximum steering angle of 45 degrees, a maximum acceleration of 0.3 G, and a system response time of 0.8 s.

(b) in FIG. 10 indicates conditions for safety supervision. In the opposite lane travel mode, the supervision required area is the own lane and the opposite lane, and supervision substitution for remote operating party H is permitted (but only for a person having a low fatigue level). This indicates that vehicle 200 itself may supervise the supervision required area (e.g., detect objects), or that remote operating party H may remotely supervise at least part of the supervision required area. Note that the fatigue level of remote operating party H can be obtained from an image captured of remote operating party H, for example. Additionally, the supervision required area of remote operating party H may be an area where vehicle 200 itself cannot detect objects or for which the reliability of the object detection is low.

(c) in FIG. 10 indicates system conditions, and in the opposite lane travel mode, the communication delay is 0.2 s (a maximum of 0.2 s), and the system state is normal.

Referring again to FIG. 8, mode changer 151 obtains the first vehicle information (S302), obtains the first remote operation information pertaining to remote operation (S303), and obtains the first system information (S304). Where the first vehicle information, the first remote operation information, and the first system information are obtained from is not particularly limited. To describe this using the first vehicle information as an example, mode changer 151 may obtain the first vehicle information from vehicle 200, read out the first vehicle information from storage 167 if the first vehicle information is stored in storage 167, or obtain the first vehicle information from a server device that manages the vehicle information of vehicle 200. Additionally, the first system information may be obtained via system information obtainer 166. It is sufficient for the first vehicle information, the first remote operation information, and the first system information to be obtained at least once, and if the first vehicle information, the first remote operation information, and the first system information have already been obtained, the processing of steps S302 to S304 may be skipped.

The first vehicle information, the first remote operation information, and the first system information will be described hereinafter with reference to FIGS. 11 to 13. FIG. 11 is a diagram illustrating an example of the first vehicle information. FIG. 12 is a diagram illustrating an example of the first remote operation information. FIG. 13 is a diagram illustrating an example of the first system information.

As illustrated in FIG. 11, the first vehicle information is information indicating the specifications of vehicle 200, and includes the maximum vehicle speed, the maximum steering angle, the maximum acceleration, the system response time, and the supervisable region. The supervisable region is the own lane, and thus vehicle 200 itself can only supervise its own lane.

As indicated in (a) and (b) of FIG. 12, the first remote operation information includes information pertaining to remote operation device 130, and information (specifications) pertaining to remote operating party H. The information pertaining to remote operation device 130 includes information pertaining to the capabilities of remote operation device 130, and includes, for example, the supervisable region that can be supervised by remote operation device 130. The example in (a) of FIG. 12 indicates that remote operation device 130 has capabilities enabling the opposite lane to be supervised. The information pertaining to remote operating party H includes permissions of remote operating party H during remote operation. The example in (b) of FIG. 12 indicates that remote operating party H has permissions for remote operation. The content illustrated in (a) and (b) of FIG. 12 is set in advance.

As illustrated in FIG. 13, the first system information is information indicating the specifications of vehicle control system 10, and includes the minimum communication delay. In the example in FIG. 13, the minimum communication delay is 0.1 s.

Referring again to FIG. 8, mode changer 151 searches for a travel mode that can be used for travel based on the various information obtained in steps S301 to S304 (S305). If the constraints are satisfied by the first vehicle information, the first remote operation information, and the first system information, mode changer 151 searches for those constraints and an ODD corresponding to those constraints as the travel mode that can be used for travel. Mode changer 151 may search for a plurality of travel modes that can be used for travel, for example.

Additionally, in step S305, mode changer 151 may determine whether the mode can be switched to the remote operation mode. Mode changer 151 may determine whether the mode can be switched to the remote operation mode based on whether constraints corresponding to the remote operation mode are satisfied. The constraints corresponding to the remote operation mode include, for example, the communication delay.

Referring again to FIG. 4, next, if there is a travel mode that can be used for travel (Yes in S104), presenter 152 presents the travel mode to remote operating party H (S105). Presenter 152 may present a plurality of travel modes to remote operating party H. Presenter 152 may superimpose buttons 112 and 113 on the image, as illustrated in (b) of FIG. 7, for example.

Note that if mode changer 151 has searched out a plurality of travel modes, presenter 152 may present the travel modes with looser constraints preferentially.

Additionally, when presenting the ODD relaxed travel mode to remote operating party H, presenter 152 may furthermore present the mode superimposed with the area which is required to be remotely supervised by remote operating party H in the ODD relaxed travel mode (e.g., the supervision required area indicated in (c) of FIG. 7; an example of a tightened supervision requirement). In this manner, the area which is required to be supervised by remote operating party H in the ODD relaxed travel mode may be presented in display device 110 before remote operating party H operates button 112.

This makes it possible for remote operating party H to determine whether to switch to the ODD relaxed travel mode having confirmed the area which they are required to supervise. Note that presenter 152 obtains the supervision required area from area determiner 161.

Next, command acceptor 153 accepts the selection of a travel mode from remote operating party H (S106). Command acceptor 153 senses an operation (e.g., a touch operation) of button 112 or 113, for example. It can also be said that command acceptor 153 accepts an operation permitting the travel mode to be switched from remote operating party H. In this manner, remote operation device 130 executes processing for switching the travel mode when, for example, an operation permitting the travel mode to be switched by remote operating party H is obtained. For example, remote operation device 130 switches to the ODD relaxed travel mode when autonomous travel with relaxed ODD is possible and remote operating party H has permitted the switch to the ODD relaxed travel mode.

When command acceptor 153 accepts the selection of the travel mode from the remote operating party H, mode changer 151 executes the travel mode switching processing for switching to the selected travel mode (S107). Mode changer 151 executes processing for switching vehicle 200 to the ODD relaxed travel mode if an operation of button 112 is sensed, and for switching vehicle 200 to the remote operation mode if an operation of button 113 is sensed. Note that the operation of button 112 is an example of a first operation.

Figure 14:
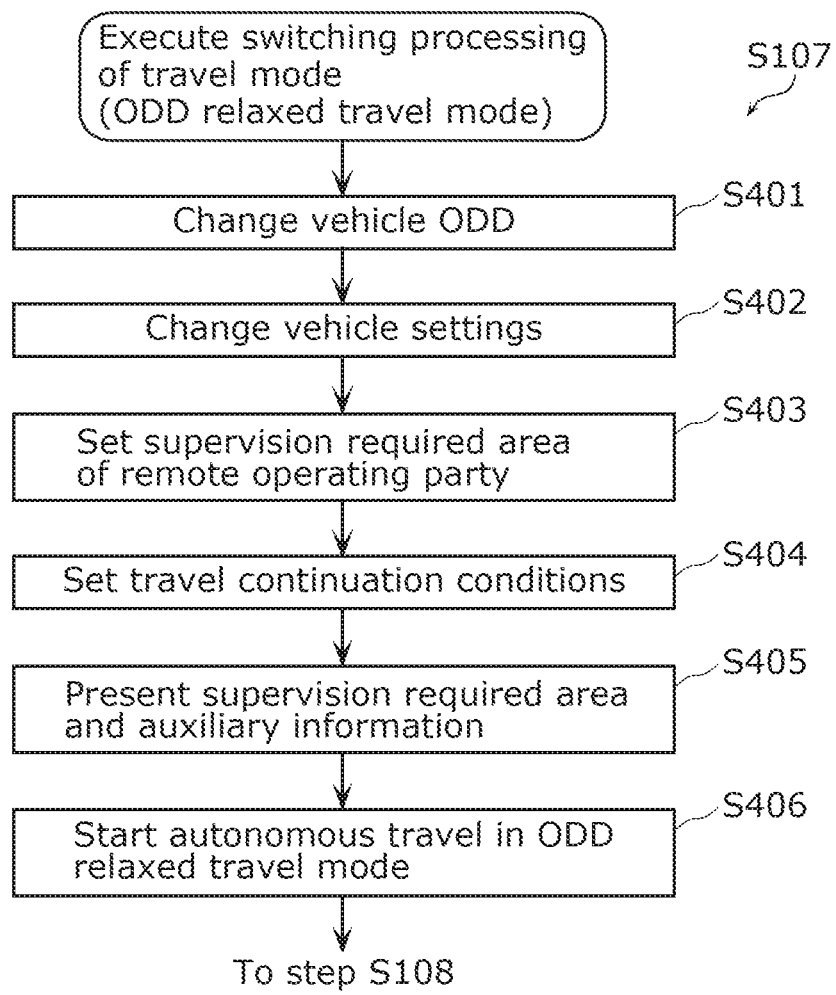
FIG. 14 is a flowchart illustrating an example of operations in switching processing, indicated in step S107 of FIG. 4.

Operations performed when command acceptor 153 accepts the selection of the opposite lane travel mode will be described here with reference to FIG. 14. FIG. 14 is a flowchart illustrating an example of operations in switching processing, indicated in step S107 of FIG. 4.

As illustrated in FIG. 14, mode changer 151 changes the ODD of vehicle 200 (S401). Mode changer 151 changes the ODD conditions of vehicle 200 to an ODD in the travel mode after the switch (see FIG. 9, for example). Mode changer 151 outputs information indicating that the ODD is to be changed to the ODD in the travel mode after the switch to vehicle 200 via communicator 140. Upon sensing that remote operating party H has operated button 112, mode changer 151 changes the ODD of vehicle 200 from the ODD for the autonomous travel mode to the ODD for the ODD relaxed travel mode. It can be said that upon sensing that remote operating party H has operated button 112, mode changer 151 relaxes the ODD of vehicle 200 compared to the ODD in a state where the operation is not sensed (the ODD for the autonomous travel mode).

Next, mode changer 151 changes settings of vehicle 200 (S402). Mode changer 151 changes criteria by which travel ability determiner 231 of vehicle 200 determines whether travel is possible. Mode changer 151 changes the criteria to the vehicle conditions in the travel mode after the switch (see (a) of FIG. 10, for example). Mode changer 151 outputs information indicating that the criteria are to be changed to the vehicle conditions in the travel mode after the switch to vehicle 200 via communicator 140. Mode changer 151 also outputs the constraints for the ODD after the switch (see FIG. 10, for example) to area determiner 161.

Note that autonomous driving traveler 232 generates the autonomous driving travel plan in the ODD relaxed travel mode based on the relaxed ODD and the changed settings of vehicle 200. It can be said that autonomous driving traveler 232 updates the travel plan in response to the ODD being relaxed. Autonomous driving traveler 232 also outputs control information based on the travel plan to vehicle controller 240 in order to execute the travel plan.

Remote operating party H may supervise the travel plan or the control information of vehicle 200 in the ODD relaxed travel mode. The information indicating the travel plan or the control information is an example of auxiliary information, and may be presented in display device 110.

In this manner, the supervision requirements may include operations of vehicle 200 which require supervision by remote operating party H, and tightening the supervision requirements may include adding supervision of the travel plan or the travel control information of vehicle 200 in response to the ODD being relaxed.

Next, area determiner 161 sets the supervision required area for remote operating party H (S403). Area determiner 161 sets the supervision required area for remote operating party H such that the constraints for the ODD after the switch are satisfied. Area determiner 161 sets the supervision required area for remote operating party H based on the constraints, the first vehicle information, and the first remote operation information. For example, of an area set as the supervision required area under conditions for safety supervision, area determiner 161 sets an area which cannot be supervised by vehicle 200 as the supervised area for remote operating party H.

As illustrated in (b) of FIG. 10, the supervision required area is the own lane and the opposite lane. Additionally, as illustrated in FIG. 11, the supervisable region of vehicle 200 is the own lane. In this case, the opposite lane cannot be supervised by vehicle 200, and thus the opposite lane is set as the supervised area for remote operating party H.

Based on the first remote operation information, relaxability determiner 162 may determine whether remote operation device 130 has the capability to supervise the supervised area set by area determiner 161, and if not, may output, to mode changer 151, information indicating that the supervision required area indicated by the constraints cannot be supervised. In this case, mode changer 151 may search again for another travel mode (e.g., another ODD relaxed travel mode).

Referring again to FIG. 14, next, travel continuability determiner 164 sets travel continuation conditions in the ODD relaxed travel mode after the switch (S404). Here, the travel continuation conditions are criteria for determining whether to continue travel in the ODD relaxed travel mode after the switch. Travel continuability determiner 164 may set the constraints of the relaxed travel mode after the switch as the travel continuation conditions, for example. Travel continuability determiner 164 can determine that the travel cannot be continued, and stop vehicle 200, when the constraints corresponding to the travel mode after the switch are no longer satisfied while traveling in the travel mode after the switch, such as, for example, when the vehicle speed goes above 10 km/h, remote operating party H can no longer supervise the opposite lane, the communication delay goes above 0.2 s, and the like. Although travel continuability determiner 164 makes the determination of step S404 while vehicle 200 is traveling in the ODD relaxed travel mode, the determination of step S404 may be made while vehicle 200 is traveling in the remote operation mode as well.

Next, presenter 152 presents the supervision required area and the auxiliary information to remote operating party H (S405). The supervision required area is the area which is required to be supervised by remote operating party H. The auxiliary information is information presented as auxiliary information during remote supervision, and includes, for example, at least one of the vehicle speed, the travel path during autonomous driving, the current travel mode, a determination result from travel continuability determiner 164, and the like.

(c) of FIG. 7 is a diagram illustrating the state of switching to the ODD relaxed travel mode. (c) of FIG. 7 indicates a state after the opposite lane travel mode has been selected in (b) of FIG. 7. Note that (c) of FIG. 7 indicates that vehicle 410 is traveling in the opposite lane. Additionally, (c) of FIG. 7 indicates the supervision required area, which is required to be supervised by remote operating party H, by dot-shaped hatching.

As indicated in (c) of FIG. 7, the supervision required area which is required to be supervised by remote operating party H in response to the ODD being relaxed and auxiliary information pertaining to the travel of vehicle 200 are presented. Presenter 152 presents the supervision required area and the auxiliary information in display device 110, superimposed on the image from vehicle 200, for example. In this manner, remote operating party H can easily know the area they are to supervise as a result of the supervision required area which is required to be supervised in response to the ODD being relaxed being presented. Note that the supervision required area required to be supervised in response to the ODD being relaxed is an example of a tightened supervision requirement.

Presenter 152 may also present, in display device 110, the travel path, the current travel mode ("ODD relaxed travel" indicated in (c) of FIG. 7), the determination result from travel continuability determiner 164 ("RUN" indicated in (c) of FIG. 7), and the like. Through this, remote operating party H can remotely supervise vehicle 200 with reference to the auxiliary information. Additionally, vehicle 410 is present in the travel path, and thus presenter 152 may present, in display device 110, cautionary information, such as "caution—front", as an alert pertaining to an approaching object. The cautionary information is also included in the auxiliary information.

Additionally, in (c) of FIG. 7, button 114 indicating "normal travel" is presented as a travel mode switch button. "Normal travel" refers to the autonomous travel mode, and when button 114 is operated, vehicle 200 switches to the autonomous travel mode. In other words, when button 114 is operated, mode changer 151 switches from the current travel mode (e.g., the ODD relaxed travel mode) to the autonomous travel mode. Button 114 being operated means that the ODD relaxed travel mode is ended.

Additionally, in (c) of FIG. 7, button 115, indicating "continue travel", is further presented. Button 115 accepts an operation from remote operating party H when the ODD relaxed travel mode is to be continued. Note that button 115 is presented when the travel mode switches to the ODD relaxed travel mode. Note that the operation of button 115 by remote operating party H is an example of a second operation.

Referring again to FIG. 14, mode changer 151 causes vehicle 200 to start autonomous travel in the ODD relaxed travel mode (S406). Mode changer 151 outputs, to vehicle 200, information indicating that autonomous travel is to start in the ODD relaxed travel mode, for example. For example, after presenting the image indicated in (c) of FIG. 7 to remote operating party H, mode changer 151 may cause vehicle 200 to start autonomous travel in the ODD relaxed travel mode upon sensing an operation (e.g., an operation of touching button 115) from remote operating party H indicating that autonomous travel in the ODD relaxed travel mode is to be started. Note that operating button 115 for starting the ODD relaxed travel mode may be the first operation.

In this manner, mode changer 151 causes vehicle 200 to travel autonomously (autonomous driving) under a relaxed ODD.

Upon obtaining information indicating that autonomous travel in the ODD relaxed travel mode is to start, autonomous driving traveler 232 of vehicle 200 generates a command to start the autonomous travel, and outputs the command to vehicle controller 240. This causes vehicle 200 to start traveling autonomously in the ODD relaxed travel mode.

In this manner, for example, when a selection of the travel mode is accepted in step S106, the switching processing of step S107 is executed one time.

Figure 15:
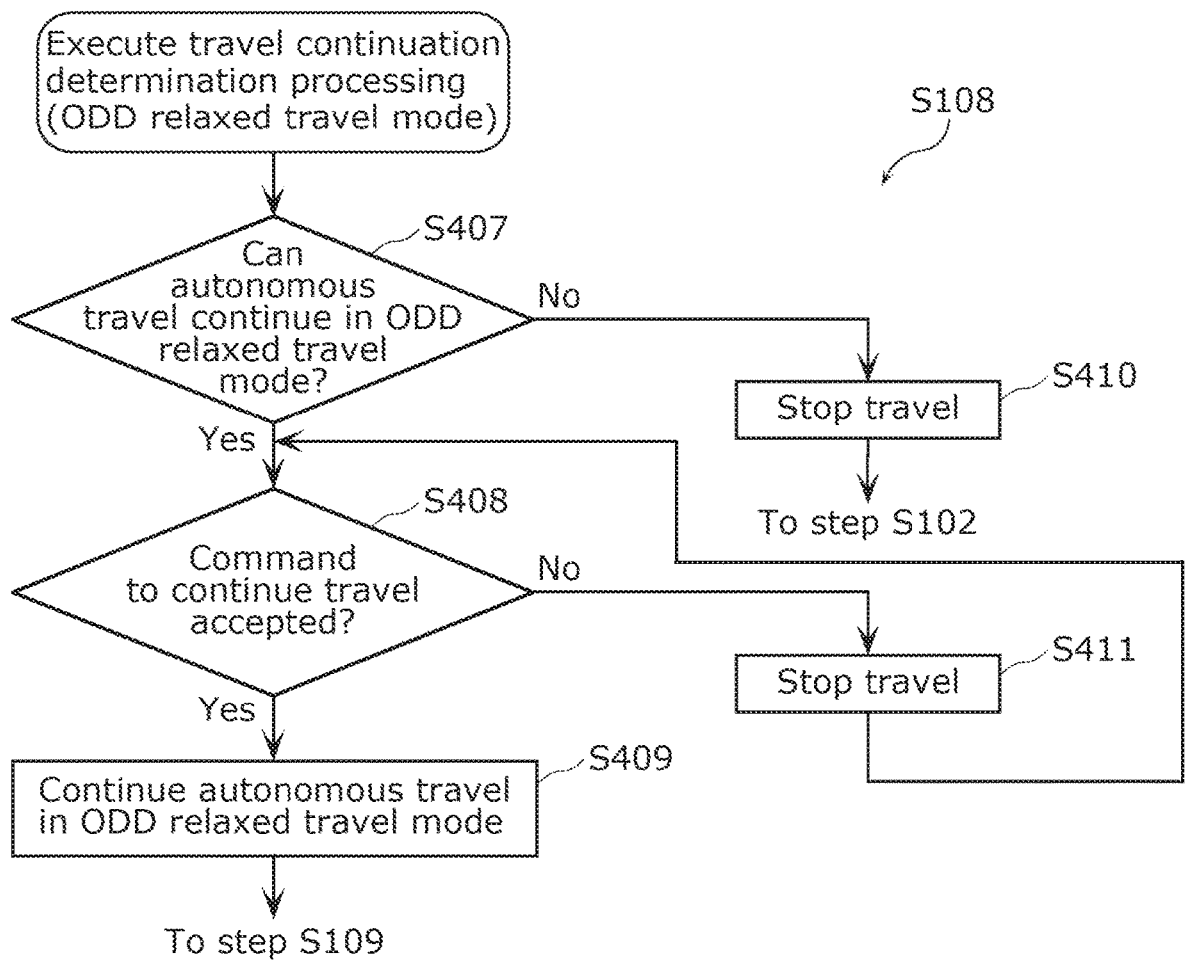
FIG. 15 is a flowchart illustrating an example of operations in determination processing, indicated in step S108 of FIG. 4.

Referring again to FIG. 4, next, travel continuability determiner 164 executes the travel continuation determination processing for vehicle 200 that is traveling autonomously in the ODD relaxed travel mode (S108). FIG. 15 is a flowchart illustrating an example of operations in the determination processing, indicated in step S108 of FIG. 4.

As illustrated in FIG. 15, travel continuability determiner 164 determines whether it is possible to continue traveling in the current travel mode when the current travel mode is the ODD relaxed travel mode or the remote operation mode. Travel continuability determiner 164 makes this determination based on whether the current state of vehicle control system 10 satisfies the travel continuation conditions corresponding to the current travel mode. Travel continuability determiner 164 repeatedly makes this determination at predetermined time intervals, for example. For example, travel continuability determiner 164 determines whether it is possible to continue autonomous travel in the ODD relaxed travel mode when the current travel mode is the ODD relaxed travel mode or the remote operation mode (S407).

Figure 16:
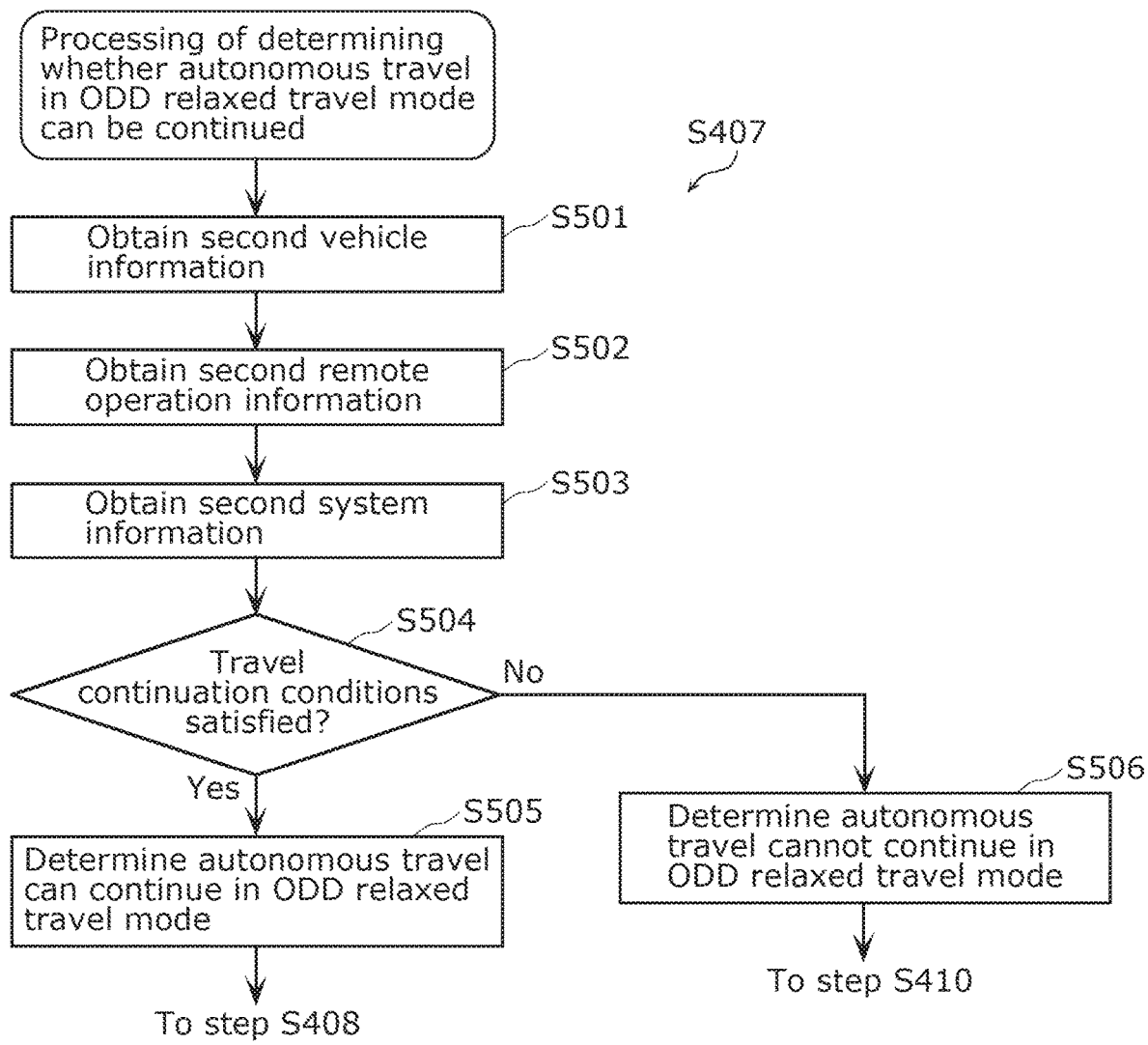
FIG. 16 is a flowchart illustrating determination processing, indicated in step S407 of FIG. 15.

The determination processing of step S407 will be described here with reference to FIG. 16. FIG. 16 is a flowchart illustrating the determination processing, indicated in step S407 of FIG. 15.

As illustrated in FIG. 16, travel continuability determiner 164 obtains the second vehicle information from vehicle 200 (S501). The second vehicle information (see FIG. 6) is sequentially obtained from vehicle 200 regardless of the travel mode.

Next, travel continuability determiner 164 obtains the second remote operation information (S502). The second remote operation information indicates the current state of remote operating party H. FIG. 17 is a diagram illustrating an example of the second remote operation information.

As illustrated in FIG. 17, the second remote operation information includes the fatigue level of remote operating party H as the current state of remote operating party H. It can be said that travel continuability determiner 164 obtains the fatigue level of remote operating party H as the current state of remote operating party H. "Fatigue level" indicates the current level of fatigue of remote operating party H and is expressed, for example, as a level such as "high", "medium", or "low", a numerical value, or the like. In the example of FIG. 17, travel continuability determiner 164 obtains a fatigue level of remote operating party H of "low".

The second remote operation information may include information other than fatigue level. The second remote operation information may further include information pertaining to remote supervision of remote operating party H. The second remote supervision information may include, for example, the result of determining whether remote operating party H is looking at display device 110 or information pertaining to the direction of the line of sight of remote operating party H. In other words, the second remote operation information may include the result of the determination as to whether remote operating party H is performing the required remote supervision. It is sufficient for the second remote operation information to include at least one of the fatigue level and information pertaining to remote supervision.

Referring again to FIG. 16, next, travel continuability determiner 164 obtains the second system information (S503). The second system information indicates the current state of vehicle control system 10. The second system information indicates the current soundness of vehicle control system 10, such as, for example, the network state such as communication delay, communication bandwidth, and the like, the operating state of the computing resources and programs of remote operation device 130, and the like. Travel continuability determiner 164 may, for example, obtain the second system information via system information obtainer 166. FIG. 18 is a diagram illustrating an example of the second system information.

As illustrated in FIG. 18, the second system information includes the communication delay in vehicle control system 10 and the system state of vehicle control system 10 as the current state of vehicle control system 10. It can be said that travel continuability determiner 164 obtains the current communication delay and system state as the current state of vehicle control system 10. In the example in FIG. 18, travel continuability determiner 164 obtains a communication delay of 0.2 s and a system state is normal (sound) as the criteria for determining whether travel can continue. Note that the method of obtaining the second system information is not particularly limited. For example, when information is obtained from vehicle 200, travel continuability determiner 164 may calculate the current communication delay based on the time the information was obtained and a timestamp included in the information. Travel continuability determiner 164 may, for example, obtain the current system state from a supervision device (not shown) that supervises the system state of vehicle control system 10.

Referring again to FIG. 16, travel continuability determiner 164 determines whether the travel continuation conditions corresponding to the current travel mode are satisfied based on the information obtained in steps S501 to S503 (S504). It can be said that travel continuability determiner 164 determines whether the current state of vehicle control system 10 satisfies the travel continuation conditions.

If the second vehicle information, the second remote operation information, and the second system information all satisfy the travel continuation conditions (Yes in S504), travel continuability determiner 164 determines that autonomous travel in the ODD relaxed travel mode can continue (S505) and moves to step S408 in FIG. 15. If the result of the determination as to whether remote operating party H is looking at display device 110, or when information pertaining to the direction of the line of sight of remote operating party H is included in the second remote supervision information, travel continuability determiner 164 may make a determination of "Yes" in step S504 if remote operating party H is looking at display device 110 or the line of sight of remote operating party H is directed toward display device 110 (e.g., in the direction of the supervision required area in display device 110). In other words, travel continuability determiner 164 may make a determination of "Yes" in step S504 if remote operating party H is supervising according to the tightened supervision requirements. This makes it possible for vehicle 200 to travel autonomously with a relaxed ODD only when remote operating party H is supervising according to the tightened supervision requirements.

If at least one of the second vehicle information, the second remote operation information, and the second system information does not satisfy the travel continuation conditions (No in S504), travel continuability determiner 164 determines that autonomous travel in the ODD relaxed travel mode cannot continue (S506) and moves to step S410 in FIG. 15.

Referring again to FIG. 15, upon determining that autonomous travel in the ODD relaxed travel mode can be continued, i.e., that the travel continuation conditions are satisfied (Yes in S407), travel continuability determiner 164 determines whether command acceptor 153 has received a command to continue travel from remote operating party H (S408). If travel continuability determiner 164 determines that autonomous travel in the ODD relaxed travel mode cannot be continued, i.e., the travel continuation conditions are not satisfied (No in S407), the travel of vehicle 200 is stopped (S410), and the processing moves to step S102 indicated in FIG. 4, where remote operating party H is notified. Note that the processing is not limited to stopping vehicle 200 in the case of No is step S407, and processing for switching the travel mode may be performed instead. In this case, remote operating party H is notified of at least one of the ODD relaxed travel mode and the remote operation mode to which the mode can be switched. The ODD relaxed travel mode that can be switched to here is the travel mode resulting in a determination of Yes in step S407, e.g., the travel mode that increases the supervision burden on remote operating party H or increases the travel restrictions compared to the current ODD relaxed travel mode. In this case, the travel of vehicle 200 need not be stopped.

(d) of FIG. 7 indicates the state of the vehicle while traveling in the ODD relaxed travel mode. (d) of FIG. 7 indicates a state in which the vehicle travels in the opposite lane in the ODD relaxed travel mode, and passes vehicle 400, from the state indicated in (c) of FIG. 7.

As illustrated in (d) of FIG. 7, travel continuability determiner 164 makes the determination of step S408 based on, for example, whether remote operating party H has operated button 115 indicating "continue travel".

As long as remote operating party H continues to operate (e.g., touch) button 115, travel in the ODD relaxed travel mode may continue. In this case, travel in the ODD relaxed travel mode is performed only during the period when remote operating party H is operating button 115. The operation of button 115 by remote operating party H being sensed corresponds, for example, to supervision being performed by remote operating party H. This supervision may be, for example, a period during which the operation of button 115 is sensed. This makes it possible for vehicle 200 to drive autonomously with a relaxed ODD only when remote operating party H is supervising according to the tightened supervision requirements (only while button 115 is being operated).

Each time remote operating party H operates button 115, the vehicle may travel in the ODD relaxed travel mode for a set time, for a set section, or for a set distance. Autonomous travel in the ODD relaxed travel mode can be continued by remote operating party H continuing to operate button 115 at predetermined time intervals.

Figures 19, 20:
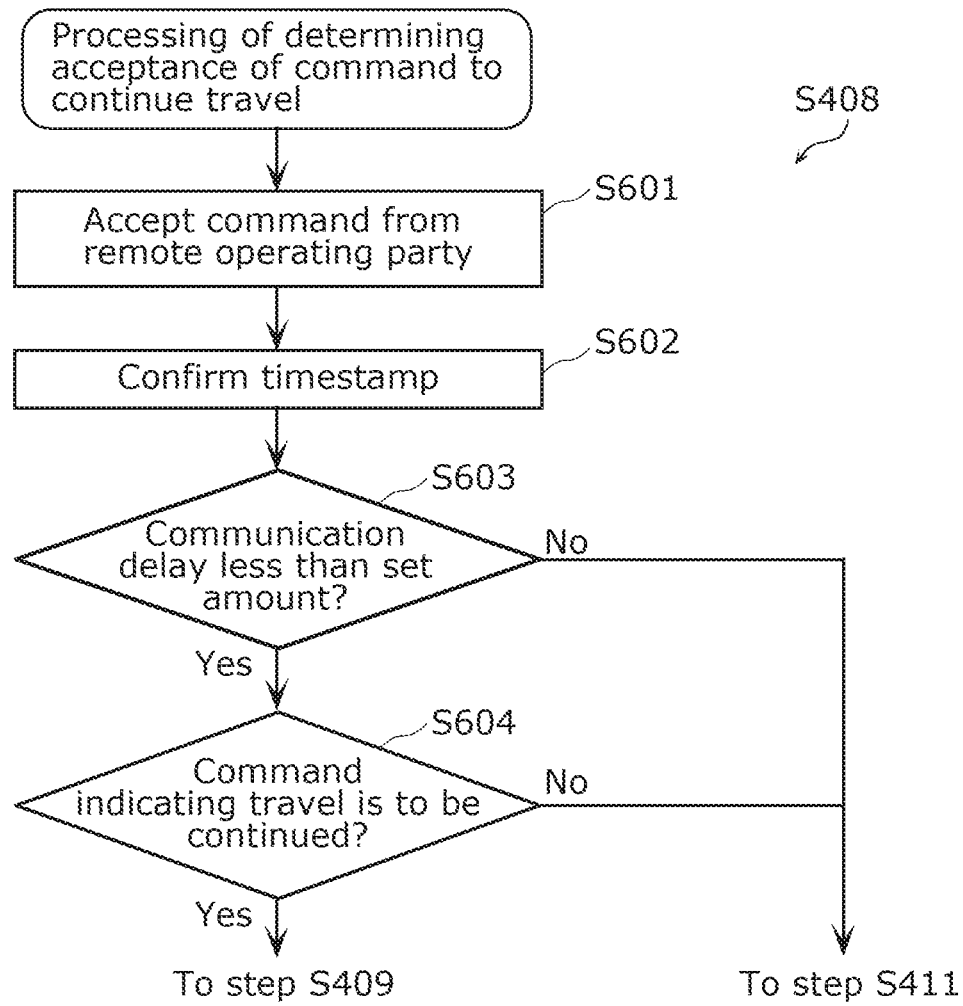
FIG. 19 is a flowchart illustrating determination processing, indicated in step S408 of FIG. 15.
FIG. 20 is a diagram illustrating an example of a command.

The processing of step S408 will be described here with reference to FIGS. 19 and 20. FIG. 19 is a flowchart illustrating the determination processing, indicated in step S408 of FIG. 15. FIG. 20 is a diagram illustrating an example of a command.

As illustrated in FIG. 19, travel continuability determiner 164 accepts a command of remote operating party H from command acceptor 153 (S601). For example, travel continuability determiner 164 accepts, from command acceptor 153, information indicating that remote operating party H has operated button 115.

Next, travel continuability determiner 164 confirms the timestamp included in the command (S602). In other words, travel continuability determiner 164 confirms the time of the operation of button 115 by remote operating party H indicated by the accepted command.

By confirming the timestamp, travel continuability determiner 164 may determine whether the command is a command obtained by an operation made by remote operating party H within a predetermined amount of time, or whether the command is the latest command. Then, travel continuability determiner 164 may determine to move to step S603 if the command is a command obtained from an operation by remote operating party H within the predetermined amount of time or is the latest command, and may determine to move to step S411 if the command is a command obtained from an operation by remote operating party H outside the predetermined time or is an older command.

As illustrated in FIG. 20, the travel permission command is a command generated by remote operating party H operating button 115, and includes a timestamp and a command. The timestamp indicates, for example, the date/time when remote operating party H operated button 115. The command indicates information corresponding to the button operated, and if button 115 has been operated, the command indicates travel continuation.

Referring again to FIG. 19, next, travel continuability determiner 164 determines whether the communication delay is no greater than a set level (S603). For example, travel continuability determiner 164 obtains the time of the current communication delay and determines that the communication delay is no greater than the set level if the obtained communication delay meets the travel continuation conditions. This makes it possible to determine whether to continue travel in the ODD relaxed travel mode according to the real-time operation of button 115 by remote operating party H.

If the communication delay is no greater than the set level (Yes in S603) and the command obtained in step S601 is a command indicating that travel is to be continued (Yes in S604), travel continuability determiner 164 determines to move to step S409, indicated in FIG. 15. However, if the communication delay is greater than the set level (No in S603) or the command obtained in step S601 is not a command indicating that travel is to be continued (No in S604), travel continuability determiner 164 determines to move to step S411, indicated in FIG. 15.

Referring again to FIG. 15, if a determination of "Yes" is made in step S408, travel continuability determiner 164 determines to continue autonomous travel in the ODD relaxed travel mode (S409) and to move to step S109 in FIG. 4. Through this, autonomous travel in the ODD relaxed travel mode is continued only when remote operating party H permits autonomous travel in the ODD relaxed travel mode to continue. Accordingly, the safety of autonomous travel in the ODD relaxed travel mode can be better ensured.

If a command to continue travel is not accepted (No in S408), travel continuability determiner 164 stops the travel of vehicle 200 (S411) and moves to step S408. The stopping of the travel here is a temporary stop, and if a command to continue travel is accepted again after the travel has stopped (Yes in step S408), vehicle 200 may resume travel in the ODD relaxed travel mode.

In this manner, when remote operating party H continues travel in the ODD relaxed travel mode, they can simply operate (e.g., touch) button 115 to continue the ODD relaxed travel mode. The burden on remote operating party H can therefore be reduced even when the ODD relaxed travel mode is to be continued. The determination processing illustrated in FIG. 15 is repeatedly executed during travel in the ODD relaxed travel mode.

Figure 22:
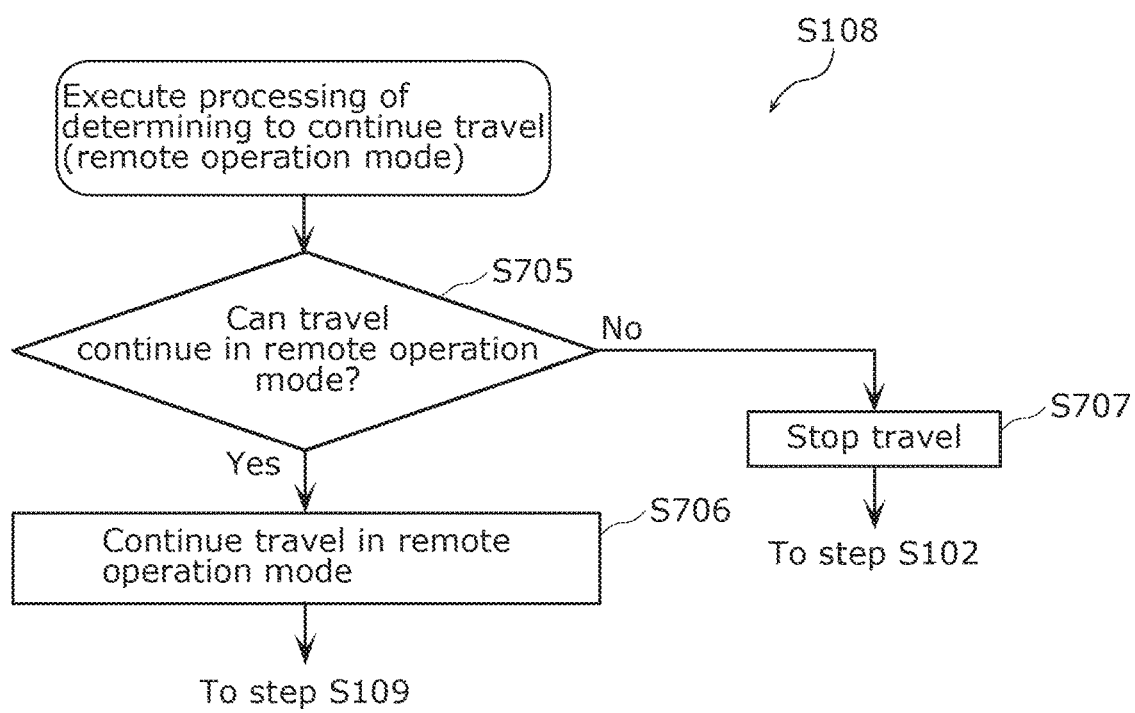
FIG. 22 is a flowchart illustrating another example of operations in determination processing, indicated in step S108 of FIG. 4.

Note that if the current travel mode is the remote operation mode, the determination processing of step S408 is not performed (see FIG. 22). In other words, if, when the current travel mode is the remote operation mode, travel continuability determiner 164 determines that travel in the remote operation mode is possible, travel in the remote operation mode is continued.

Referring again to FIG. 4, if an operation for switching to the autonomous driving mode is obtained during travel in the ODD relaxed travel mode or the remote operation mode (Yes in S109), mode changer 151 switches the travel mode to the autonomous driving mode (S111) and returns to step S101 to continue the subsequent processing. If an operation for switching to the autonomous driving mode is not obtained during travel in the ODD relaxed travel mode or the remote operation mode (No in S109), mode changer 151 determines whether the destination has been arrived at (S110). If the destination has been arrived at (Yes in S110), remote supervision and remote operation of vehicle 200 by remote operating party H is ended. If the destination has not been arrived at (No in S110), mode changer 151 moves to step S108 and continues the subsequent processing.

If there is no travel mode (No in S104), presenter 152 presents an indication that travel is not possible in display device 110, and ends the travel by vehicle 200 (S113).

It can be said that the processing of steps S103 to S105, S112, and S113 illustrated in FIG. 4 is processing for determining whether mode switching is possible.

Figure 21:
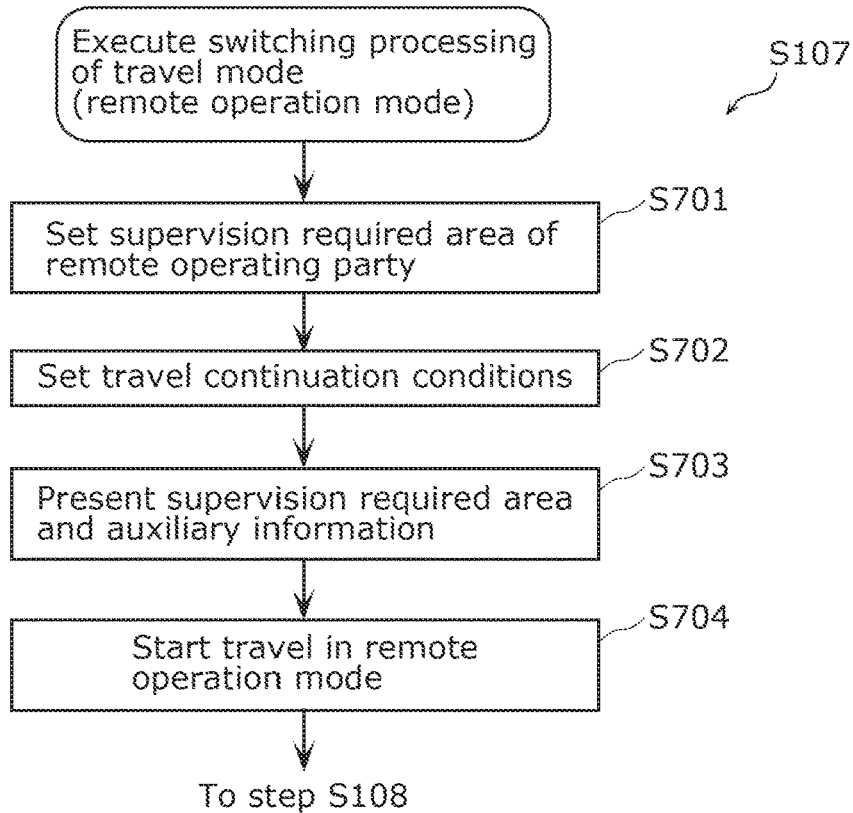
FIG. 21 is a flowchart illustrating another example of operations in switching processing, indicated in step S107 of FIG. 4.

Operations when command acceptor 153 accepts the selection of the remote operation mode, e.g., when remote operating party H operates button 113 in the image in (b) of FIG. 7, will be described next with reference to FIG. 21. FIG. 21 is a flowchart illustrating another example of operations for controlling travel, indicated in step S107 of FIG. 4.

As illustrated in FIG. 21, area determiner 161 sets the supervision required area for remote operating party H (S701). Area determiner 161 sets the supervision required area for remote operating party H such that the constraints for the remote operation mode are satisfied. For example, area determiner 161 sets an area set as the supervision required area under the safety supervision conditions as the supervised area for remote operating party H. The supervision required area under the safety supervision conditions may be the entire perimeter of vehicle 200.

Based on the first remote operation information, remote operability determiner 163 may determine whether remote operation device 130 has the capability to supervise the supervised area set by area determiner 161, and if not, may output, to mode changer 151, information indicating that the supervision required area indicated by the constraints cannot be supervised. In this case, mode changer 151 may search again for another travel mode (e.g., the ODD relaxed travel mode), or may stop the travel of vehicle 200.

Next, travel continuability determiner 164 sets the travel continuation conditions in the remote operation mode (S702). Here, the travel continuation conditions are criteria for determining whether to continue travel in the remote operation mode. Travel continuability determiner 164 may set the constraints of the remote operation mode as the travel continuation conditions, for example. The constraints of the remote operation mode include, for example, at least some of the conditions indicated in (a) through (c) of FIG. 10.

Next, presenter 152 presents the supervision required area and the auxiliary information to remote operating party H (S703). The supervision required area is the area which is required to be supervised by remote operating party H. The auxiliary information is information presented as auxiliary information during remote operation, and includes, for example, at least one of the vehicle speed, the current travel mode, a determination result from travel continuability determiner 164, and the like.

Next, mode changer 151 causes vehicle 200 to start autonomous travel in the remote operation mode (S704). For example, when an operation accepted by operation input device 120 is obtained, operation acceptor 154 starts travel in the remote operation mode by generating control information based on the obtained operation and outputting the control information to vehicle 200.

In this manner, for example, when a selection of the travel mode is accepted in step S106, the switching processing of step S107 is executed one time.

Referring again to FIG. 4, next, travel continuability determiner 164 executes the travel continuation determination processing for vehicle 200 that is traveling in the remote operation mode (S108). FIG. 22 is a flowchart illustrating another example of operations in the determination processing, indicated in step S108 of FIG. 4.

As illustrated in FIG. 22, next, travel continuability determiner 164 determines whether or not travel can be continued in the remote operation mode (S705). If travel continuability determiner 164 determines that travel in the remote operation mode can be continued, i.e., that the travel continuation conditions are satisfied (Yes in S705), travel in the remote operation mode is continued (S706) and the processing moves to step S109 in FIG. 4. If travel continuability determiner 164 determines that travel in the remote operation mode cannot be continued, i.e., the travel continuation conditions are not satisfied (No in S705), the travel of vehicle 200 is stopped (S707), and the processing moves to step S102 in FIG. 4, where remote operating party H is notified.

Note that the processing is not limited to stopping vehicle 200 in the case of No is step S705, and processing for switching the travel mode may be performed instead. For example, if vehicle 200 is a vehicle that can be driven manually, processing for switching to a manual driving mode may be performed. In this case, remote operating party H is notified of information indicating the switch to the manual driving mode. In this case, the travel of vehicle 200 need not be stopped. The ODD relaxed mode may be switched to, if such a selection is possible.

The determination processing illustrated in FIG. 22 is repeatedly executed during travel in the remote operation mode.

3. Application Examples

Application examples when applying a switch to the ODD relaxed travel mode under various circumstances will be described hereinafter with reference to FIGS. 23 to 32C. The application examples described below are examples, and the ODDs and constraints corresponding to the situation of vehicle 200 are not limited to those described below. For convenience, the following describes a case of switching from the autonomous travel mode to the ODD relaxed travel mode.

Figure 23:
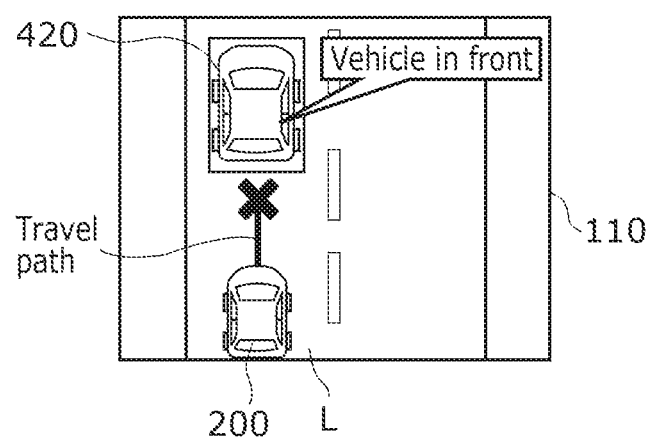
FIG. 23 is a diagram illustrating circumstances in a first application example in which ODD is relaxed.

First, a first application example will be described with reference to FIGS. 23 to 24B. FIG. 23 is a diagram illustrating circumstances in the first application example in which the ODD is relaxed. FIG. 23 is, for example, an image displayed in display device 110, and is an image confirmed by, for example, remote operating party H. FIG. 24A is a diagram illustrating various conditions (the ODD and constraints) in the autonomous travel mode in the first application example. FIG. 24B is a diagram illustrating various conditions (the ODD and constraints) in the ODD relaxed travel mode in the first application example.

A case where the types of objects passed during travel in the ODD are relaxed will be described as the first application example. Specifically, the following describes a case in which vehicle 420 that is not pulled over onto the shoulder is stopped in front of vehicle 200, and a vehicle not pulled over onto the shoulder is not included in the objects to be passed of the ODD in the autonomous travel mode. A frame surrounding vehicle 420 is indicated in the drawings to show that vehicle 200 has sensed vehicle 420 through sensing.

As illustrated in FIG. 23, vehicle 200 has vehicle 420 (a vehicle traveling in front), which is not pulled over onto the shoulder, stopped in front, but because vehicle 420 is not included in the objects to be passed of the ODD, vehicle 200 cannot pass in the autonomous travel mode. The x mark in FIG. 23 indicates that the vehicle cannot travel. The x mark may be included in the auxiliary information.

As illustrated in FIG. 24A, in the autonomous travel mode, the objects to be passed in the ODD include a vehicles (on the shoulder) and color cones (registered trademark). In other words, in the autonomous travel mode, vehicle 200 cannot pass vehicle 420 that has not pulled over onto the shoulder.

Accordingly, remote operation device 130 switches from the autonomous travel mode to the ODD relaxed travel mode. Specifically, remote operation device 130 switches to the ODD relaxed travel mode, in which vehicles which have not pulled over onto the shoulder can also be passed. In step S103 of FIG. 4, remote operation device 130 searches, from the plurality of ODD relaxed travel modes stored in storage 167, for an ODD relaxed travel mode in which vehicles which have not pulled over onto the shoulder can also be passed. FIG. 24B indicates various conditions in the ODD relaxed travel mode searched out in step S103, for example.

As illustrated in FIG. 24B, vehicles (traveling in front) and pedestrians (at rest) are added to the objects to be passed in the ODD of the ODD relaxed travel mode. In other words, in the ODD relaxed travel mode, vehicle 200 can pass vehicle 420 that has not pulled over onto the shoulder. Instead of relaxing the ODD conditions, the constraints in the ODD relaxed travel mode are stricter than the constraints in the autonomous travel mode. For example, the vehicle conditions reduce the maximum vehicle speed from 20 km/h to 5 km/h.

In this manner, as the ODD is relaxed, the restrictions on the autonomous driving travel state are tightened. For example, as the ODD is relaxed, at least one of the restrictions for the maximum vehicle speed, the maximum steering angle, and the maximum acceleration during autonomous driving under the relaxed ODD is tightened. Specifically, the value of at least one of the maximum vehicle speed, the maximum steering angle, and the maximum acceleration is changed to a lower value. In the example in FIG. 24B, the restriction on the maximum vehicle speed is tightened.

In addition, vehicles traveling in front are added to the remote supervision required objects as a condition for safety supervision. In other words, it is necessary for remote operating party H to supervise vehicles traveling in front in order to travel in the ODD relaxed travel mode.

In this manner, as the ODD is relaxed, the supervision requirements of remote operating party H for vehicle 200 are tightened. Tightening the supervision requirements includes, for example, tightening the supervision of at least one of the supervised area and supervised objects to be supervised by remote operating party H during autonomous driving under the relaxed ODD, in accordance with the relaxation of the ODD. It can be said that the supervised area and the supervised objects supervised by remote operating party H are changed to the supervised area and supervised objects during autonomous driving when the ODD is relaxed. Specifically, this includes broadening the supervised area or increasing the number of supervised objects. In the example in FIG. 24B, the supervision of the supervised objects is tightened.

If the constraints illustrated in FIG. 24B are satisfied, vehicle 200 can, traveling autonomously, pass vehicle 420 which has not pulled over onto the shoulder, while being supervised by remote operating party H.

Figure 25:
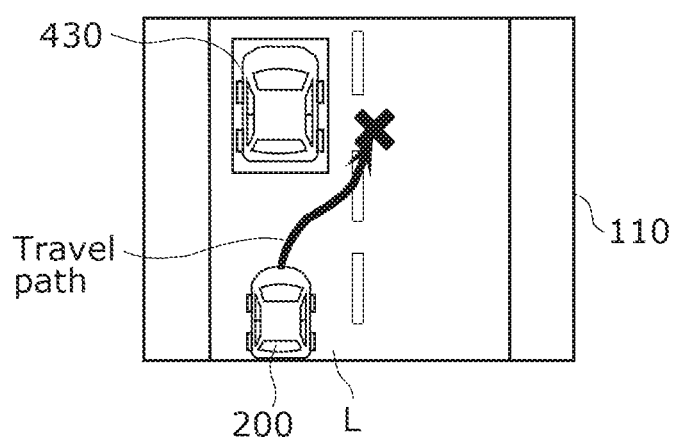
FIG. 25 is a diagram illustrating circumstances in a second application example in which ODD is relaxed.

Next, a second application example will be described with reference to FIGS. 25 to 26B. FIG. 25 is a diagram illustrating circumstances in the second application example in which the ODD is relaxed. FIG. 26A is a diagram illustrating various conditions in the autonomous travel mode in the second application example. FIG. 26B is a diagram illustrating various conditions in the ODD relaxed travel mode in the second application example.

A case where the travelable area in the ODD is relaxed will be described as the second application example. Specifically, the following describes a case in which vehicle 430 that is not pulled over onto the shoulder is stopped in front of vehicle 200, and the opposite lane is not included in the travelable area in the autonomous travel mode.

As illustrated in FIG. 25, vehicle 200 has vehicle 430, which is not pulled over onto the shoulder, stopped in front, and it is necessary to travel in the opposite lane in order to pass vehicle 430, but because the opposite lane is not included in the travelable area in the ODD, vehicle 200 cannot pass in the autonomous travel mode.

As illustrated in FIG. 26A, in the autonomous travel mode, the travelable area in the ODD includes only the own lane. In other words, in the autonomous travel mode, vehicle 200 cannot pass vehicle 430 by traveling in the opposite lane.

Accordingly, remote operation device 130 switches from the autonomous travel mode to the ODD relaxed travel mode. Specifically, remote operation device 130 switches to the ODD relaxed travel mode in which travel in the opposite lane is also possible. In step S103 of FIG. 4, remote operation device 130 searches, from the plurality of ODD relaxed travel modes stored in storage 167, for an ODD relaxed travel mode in which travel in the opposite lane is also possible. FIG. 26B indicates various conditions in the ODD relaxed travel mode searched out in step S103, for example.

As illustrated in FIG. 26B, the opposite lane is added to the travelable area in the ODD relaxed travel mode. In other words, in the ODD relaxed travel mode, vehicle 200 can pass vehicle 430 by traveling in the opposite lane. Instead of relaxing the ODD conditions, the constraints in the ODD relaxed travel mode are stricter than the constraints in the autonomous travel mode. The vehicle conditions reduce the maximum vehicle speed from 20 km/h to 5 km/h. In this manner, in the example in FIG. 26B, the restriction on the maximum vehicle speed is tightened.

In addition, the opposite lane is added to the supervised region as a condition for safety supervision. In other words, it is necessary for remote operating party H to supervise the opposite lane in order to travel in the ODD relaxed travel mode. In this manner, in the example in FIG. 26B, the supervised region (supervised area) is expanded.

If the constraints illustrated in FIG. 26B are satisfied, vehicle 200 can, traveling autonomously, pass vehicle 430 by traveling in the opposite lane, while being supervised by remote operating party H.

Figure 27:
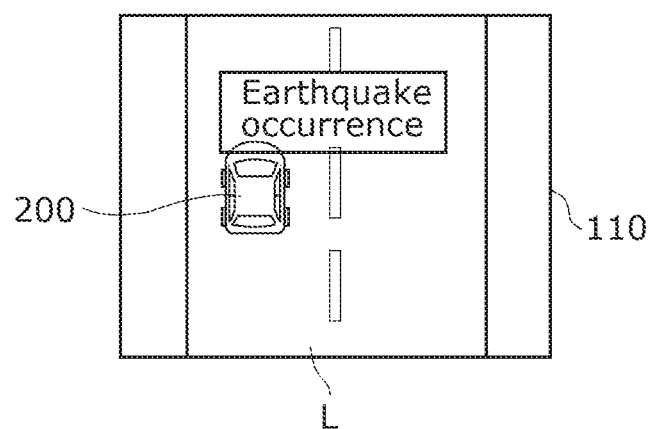
FIG. 27 is a diagram illustrating circumstances in a third application example in which ODD is relaxed.

Next, a third application example will be described with reference to FIGS. 27 to 28B. FIG. 27 is a diagram illustrating circumstances in a third application example in which ODD is relaxed. FIG. 28A is a diagram illustrating various conditions in an autonomous travel mode in the third application example. FIG. 28B is a diagram illustrating various conditions in an ODD relaxed travel mode in the third application example.

A case where the travel unable conditions in the ODD are relaxed will be described as the third application example. The travel unable conditions are conditions that prohibit vehicle 200 from traveling. Specifically, a case will be described in which an earthquake occurs while the vehicle is traveling in the autonomous travel mode, and earthquakes (intensity: 3 or higher) is included in the travel unable conditions in the autonomous travel mode. Vehicle 200 obtains information pertaining to the weather or disasters, such as the occurrence of an earthquake, for example, from an external device through communication.

As illustrated in FIG. 27, when an earthquake of intensity 3 or higher occurs, vehicle 200 stops, because the occurrence of an earthquake (intensity: 3 or higher) is included in the travel unable conditions in the ODD.

As illustrated in FIG. 28A, in the autonomous travel mode, the travel unable conditions in the ODD include conditions related to weather and disasters. Specifically, the travel unable conditions in the ODD include earthquakes (intensity: 3 or higher), heavy rain (precipitation: 200 mm or more), dense fog (visibility: 60 m or less), and strong winds (wind speed: 15 m/s or higher). In other words, in the autonomous travel mode, vehicle 200 cannot travel in the event of an earthquake of intensity 3 or higher.

Accordingly, remote operation device 130 switches from the autonomous travel mode to the ODD relaxed travel mode. Specifically, remote operation device 130 switches to the ODD relaxed travel mode in which travel is possible even if an earthquake of intensity 3 or higher occurs. In step S103 of FIG. 4, remote operation device 130 searches, from the plurality of ODD relaxed travel modes stored in storage 167, for an ODD relaxed travel mode in which travel is possible even if an earthquake of intensity 3 or higher occurs. FIG. 28B indicates various conditions in the ODD relaxed travel mode searched out in step S103, for example.

As illustrated in FIG. 28B, earthquakes are removed from the travel unable conditions in the ODD relaxed travel mode. In other words, in the ODD relaxed travel mode, vehicle 200 can travel even during an earthquake. Instead of relaxing the ODD conditions, the constraints in the ODD relaxed travel mode are stricter than the constraints in the autonomous travel mode. The vehicle conditions reduce the maximum vehicle speed from 20 km/h to 10 km/h. In the example in FIG. 28B, the restriction on the maximum vehicle speed is tightened.

In addition, a double check of vehicle 200 and remote operating party H is added to the supervised region as a condition for safety supervision. In other words, it is necessary for remote operating party H to supervise the own lane in order to travel in the ODD relaxed travel mode. In the example in FIG. 28B, the restriction on the supervised region is tightened.

If the constraints illustrated in FIG. 28B are satisfied, vehicle 200 can travel autonomously even if an earthquake occurs, while being supervised by remote operating party H. This makes it possible for vehicle 200 to evacuate to a safe location in the event of an earthquake, for example.

Figure 29:
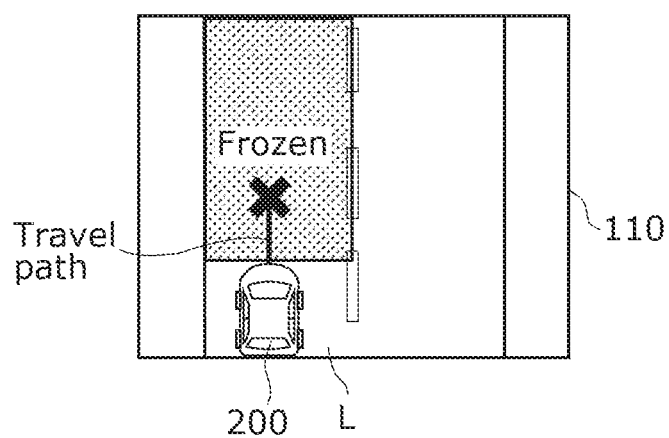
FIG. 29 is a diagram illustrating circumstances in a fourth application example in which ODD is relaxed.

Next, a fourth application example will be described with reference to FIGS. 29 to 30B. FIG. 29 is a diagram illustrating circumstances in the fourth application example in which ODD is relaxed. FIG. 30A is a diagram illustrating various conditions in the autonomous travel mode in the fourth application example. FIG. 30B is a diagram illustrating various conditions in the ODD relaxed travel mode in the fourth application example. In FIG. 29, the dot-shaped hatching indicates areas where the road surface is frozen on road L.

A case where a travel unable area state in the ODD is relaxed will be described as the fourth application example. The travel unable area state is a road surface state that prohibits vehicle 200 from traveling. Specifically, the following will describe a case where the road surface is frozen and freezing is included in the travel unable area state in the autonomous travel mode.

As illustrated in FIG. 29, when the road surface in the travel direction is frozen, vehicle 200 stops, because the travel unable area state in the ODD includes the road surface being frozen.

As illustrated in FIG. 30A, in the autonomous travel mode, the travel unable area state in the ODD includes the road surface being frozen and the road surface being flooded (10 cm or more). In other words, in the autonomous travel mode, vehicle 200 cannot travel if the road surface is frozen.

Accordingly, remote operation device 130 switches from the autonomous travel mode to the ODD relaxed travel mode. Specifically, remote operation device 130 switches to the ODD relaxed travel mode in which travel is possible even when the road surface is frozen. In step S103 of FIG. 4, remote operation device 130 searches, from the plurality of ODD relaxed travel modes stored in storage 167, for an ODD relaxed travel mode in which travel is possible even when the road surface is frozen. FIG. 30B indicates various conditions in the ODD relaxed travel mode searched out in step S103, for example.

As illustrated in FIG. 30B, the road surface being frozen is removed from the travel unable area state in the ODD relaxed travel mode. In other words, in the ODD relaxed travel mode, vehicle 200 can travel even when the road surface is frozen. Instead of relaxing the ODD conditions, the constraints in the ODD relaxed travel mode are stricter than the constraints in the autonomous travel mode. The vehicle conditions reduce the maximum vehicle speed from 20 km/h to 5 km/h and reduce the maximum acceleration from 0.3 G to 0.1 G. In the example in FIG. 30B, the restrictions on the maximum vehicle speed and the maximum acceleration are tightened.

In addition, a double check of vehicle 200 and remote operating party H is added to the supervised region as a condition for safety supervision. In other words, it is necessary for remote operating party H to supervise the own lane in order to travel in the ODD relaxed travel mode. In the example in FIG. 30B, the restriction on the supervised region is tightened.

If the constraints illustrated in FIG. 30B are satisfied, vehicle 200 can travel autonomously at a low speed even if the road surface is frozen, while being supervised by remote operating party H.

Figure 31:
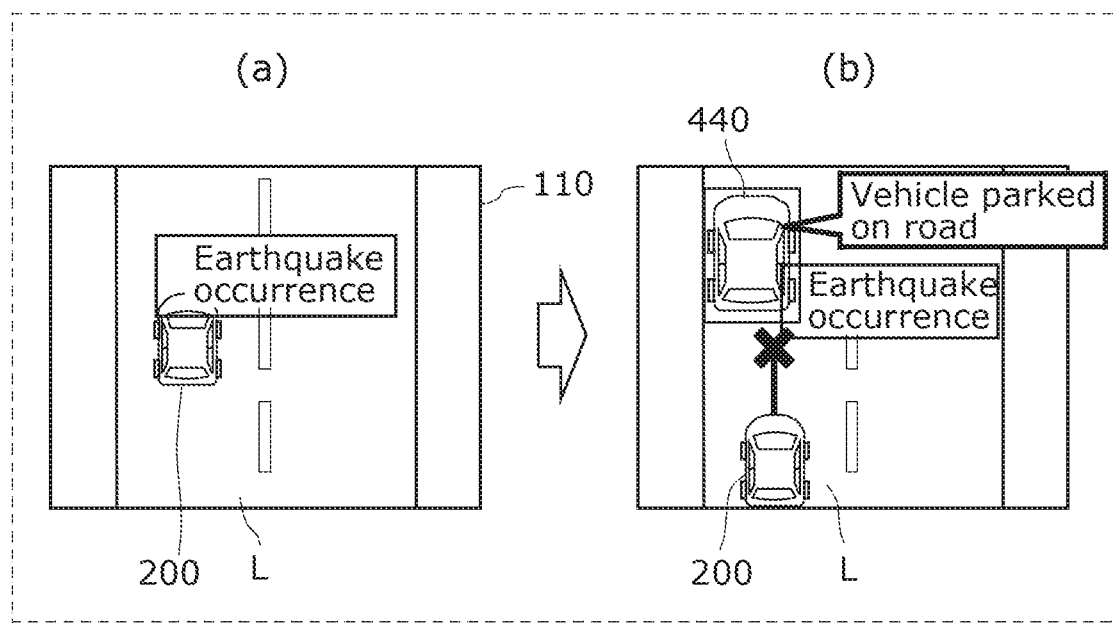
FIG. 31 is a diagram illustrating circumstances in a fifth application example in which ODD is relaxed.

Next, a fifth application example will be described with reference to FIGS. 31 to 32C. FIG. 31 is a diagram illustrating circumstances in the fifth application example in which ODD is relaxed. FIG. 32A is a diagram illustrating various conditions in the autonomous travel mode in the fifth application example. FIG. 32B is a diagram illustrating various conditions in a first ODD relaxed travel mode in the fifth application example. FIG. 32C is a diagram illustrating various conditions in a second ODD relaxed travel mode in the fifth application example. Note that (a) in FIG. 31 is the same as FIG. 27.

A case where the ODD is further relaxed while traveling in the ODD relaxed travel mode will be described as the fifth application example. In other words, a case where the ODD is relaxed in stages will be described as the fifth application example. Specifically, a case will be described in which an earthquake occurs while traveling in the autonomous travel mode, and the mode is therefore switched to an ODD relaxed travel mode in which travel is possible even during an earthquake (the first ODD relaxed travel mode), but vehicle 440, which is pulled over onto the shoulder, is stopped while traveling in the stated ODD relaxed travel mode, and thus the mode is switched to an ODD relaxed travel mode in which travel is possible even when an earthquake occurs and vehicle 440, which is pulled over onto the shoulder, is stopped (the second ODD relaxed travel mode).

The case where an earthquake occurs while traveling in the autonomous travel mode will be described first.

As illustrated in (a) of FIG. 31, when an earthquake of intensity 3 or higher occurs, vehicle 200 stops, because the occurrence of an earthquake (intensity: 3 or higher) is included in the travel unable conditions in the ODD. At this time, vehicle 200 can travel by switching to the ODD relaxed travel mode in which travel is possible even during an earthquake of intensity 3 or higher.

As illustrated in FIG. 32A, in the autonomous travel mode, the travel unable conditions in the ODD include earthquakes (intensity: 3 or higher), heavy rain (precipitation: 200 mm or more), dense fog (visibility: 60 m or less), and strong winds (wind speed: 15 m/s or higher). In other words, in the autonomous travel mode, vehicle 200 cannot travel in the event of an earthquake of intensity 3 or higher. Note that in the autonomous travel mode, nothing is set for the objects to be passed in the ODD.

Accordingly, remote operation device 130 switches from the autonomous travel mode to the ODD relaxed travel mode. This switching of the travel mode is the same as in the third application example, and the descriptions will therefore be simplified. Assume that in step S103 of FIG. 4, remote operation device 130 has searched out the first ODD relaxed travel mode illustrated in FIG. 32B.

As illustrated in FIG. 32B, earthquakes are removed from the travel unable conditions in the first ODD relaxed travel mode, and thus travel is possible even when an earthquake occurs. Additionally, the constraints in the first ODD relaxed travel mode are stricter than the constraints in the autonomous travel mode. In the example in FIG. 32B, the restrictions on the maximum vehicle speed and the supervised region are tightened.

If the constraints illustrated in FIG. 32B are satisfied, vehicle 200 can travel autonomously even if an earthquake occurs, while being supervised by remote operating party H.

A case where vehicle 440, which is pulled over onto the shoulder, appears in front during travel in the first ODD relaxed travel mode will be described next.

As illustrated in (b) of FIG. 31, vehicle 200 has vehicle 440 (a vehicle parked on the road), which is pulled over onto the shoulder, stopped in front, but because vehicle 440, which is pulled over onto the shoulder, is not included in the objects to be passed of the ODD, vehicle 200 cannot pass vehicle 440 in the first ODD relaxed travel mode.

As illustrated in FIG. 32B, in the first ODD relaxed travel mode, the objects to be passed in the ODD do not include vehicle 440 that is pulled over onto the shoulder. In other words, in the first relaxed travel mode, vehicle 200 cannot pass vehicle 440 that is pulled over onto the shoulder.

Accordingly, remote operation device 130 switches from the first ODD relaxed travel mode to the second ODD relaxed travel mode. Specifically, remote operation device 130 switches to the ODD relaxed travel mode, in which vehicles which are pulled over onto the shoulder can also be passed. In step S103 of FIG. 4, remote operation device 130 searches, from the plurality of ODD relaxed travel modes stored in storage 167, for an ODD relaxed travel mode in which travel is possible even when an earthquake occurs and vehicles which are pulled over onto the shoulder can also be passed. FIG. 32C indicates various conditions in the ODD relaxed travel mode searched out in step S103, for example.

As illustrated in FIG. 32C, vehicles (on the shoulder) are added to the objects to be passed in the ODD of the second ODD relaxed travel mode. In other words, in the second ODD relaxed travel mode, vehicle 200 can pass vehicle 440 that is pulled over onto the shoulder when an earthquake occurs.

Instead of relaxing the ODD conditions, the constraints in the second ODD relaxed travel mode are stricter than the constraints in the first ODD relaxed travel mode. The vehicle conditions reduce the maximum vehicle speed from 10 km/h to 5 km/h. In the example in FIG. 32C, the restriction on the maximum vehicle speed is tightened even more.

In addition, vehicles traveling in front are added to the remote supervision required objects as a condition for safety supervision. In other words, it is necessary for remote operating party H to supervise vehicles traveling in front in order to travel in the second ODD relaxed travel mode. In the example in FIG. 32C, the restrictions on the remote supervision required objects are tightened.

If the constraints illustrated in FIG. 32C are satisfied, vehicle 200 can, traveling autonomously, pass vehicle 440 which is pulled over onto the shoulder, while an earthquake is occurring, while being supervised by remote operating party H.

In this manner, as the relaxation level of the ODD increases, the constraints become more stringent.

Remote operation device 130 may, for example, switch from the second ODD relaxed travel mode to a third ODD relaxed travel mode in which the ODD is relaxed even more, depending on the conditions around vehicle 200. In this manner, remote operation device 130 may change the relaxation level of the ODD in stages according to the travel environment of vehicle 200 and the like. The processing of step S106 is executed even if the relaxation level of the ODD is changed. In other words, an operation indicating that the switching of the travel mode is permitted is accepted from remote operating party H, in both a case of switching from the autonomous travel mode to the first ODD relaxed travel mode, and a case of switching from the first ODD relaxed travel mode to the second ODD relaxed travel mode.

Although the foregoing application examples describe examples in which the restrictions on the system conditions are not tightened, the configuration is not limited thereto. The restrictions on the system conditions may be tightened as the ODD is relaxed. For example, as the ODD is relaxed, the restriction on the communication delay during autonomous driving under the relaxed ODD may be tightened. Specifically, the value of the acceptable communication delay may be changed to a lower value.

In addition, restrictions on the processing load of remote operation system 100 may be tightened in response to the relaxation of the ODD. For example, a threshold (e.g., an upper limit value) for the processing load of remote operation system 100 may be lowered in response to the ODD being relaxed. The processing load includes, for example, at least one of a processing amount and processing delay (e.g., processing time of remote operation device 130) in remote operation system 100. Tightening the restrictions on the processing load of remote operation system 100 is an example of tightening restrictions on processing pertaining to supervision by remote operating party H.

The relaxation of the ODD may also be the relaxation of at least one of the vehicle conditions. Relaxing the ODD may, for example, be relaxing the maximum steering angle, i.e., to allow for sharp changes in steering. Relaxing the ODD may also be relaxing weather conditions in the travel unable conditions in the ODD. Relaxing the ODD may be, for example, lifting restrictions on travel in wet weather or changing the precipitation for determining that driving in wet weather is not possible to a higher value.

In autonomous driving in the ODD relaxed travel mode, a travel range to be traveled in the autonomous driving may be restricted. For example, a time, a section, or a distance that the vehicle will continue to travel in the ODD relaxed travel mode when remote operating party H operates button 115 may be set in the system conditions. The travel range restriction may be tightened by changing the time, the section, or the distance to a lower value in response to the relaxation of the ODD.

Variation on Embodiment

Figure 33:
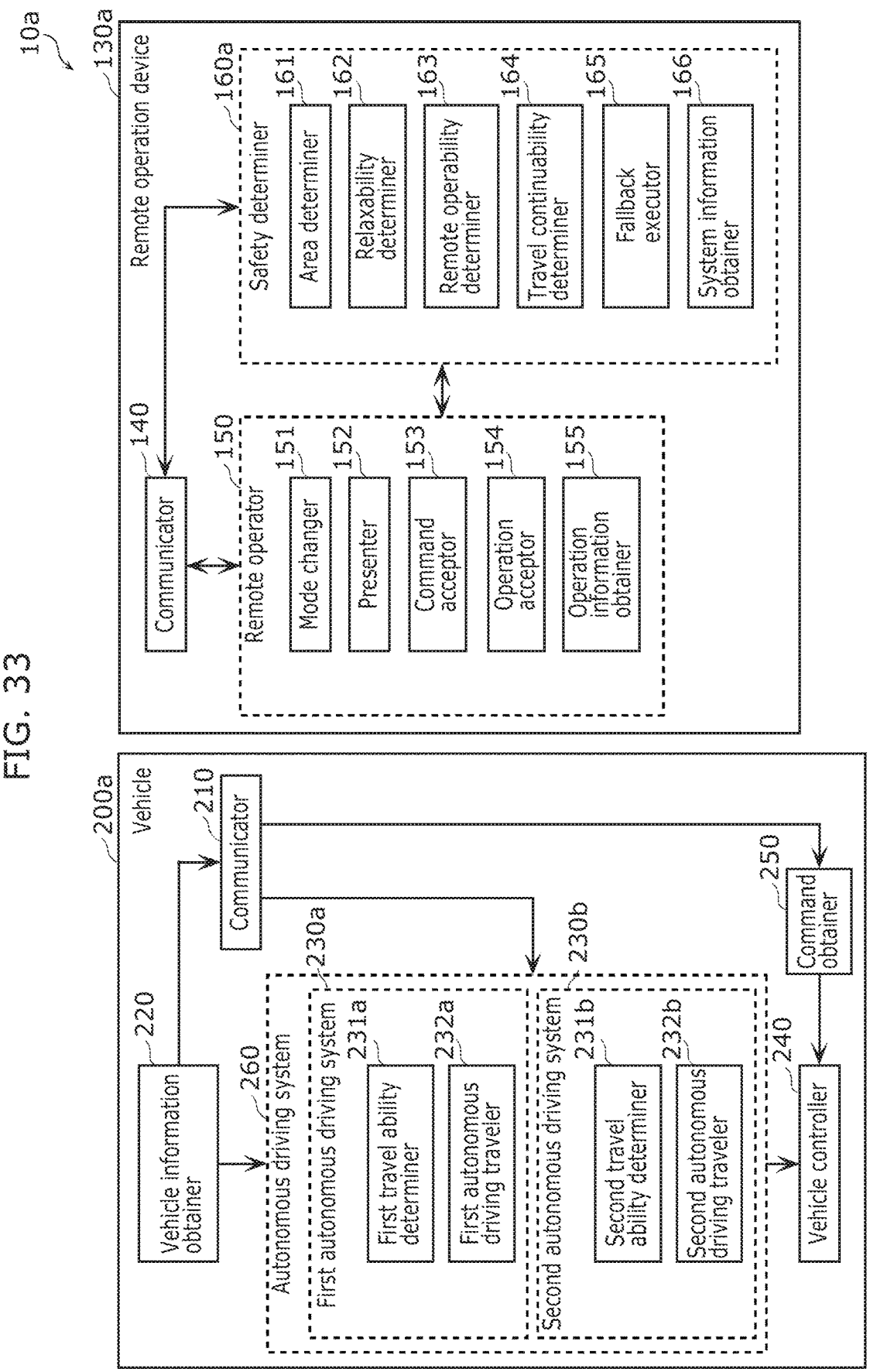
FIG. 33 is a block diagram illustrating the functional configuration of a vehicle control system according to a variation on the embodiment.

A vehicle control system according to the present variation will be described hereinafter with reference to FIG. 33. FIG. 33 is a block diagram illustrating the functional configuration of vehicle control system 10a according to the present variation. Vehicle control system 10a according to the present variation differs from vehicle control system 10 according to the embodiment mainly in that vehicle 200a includes a plurality of autonomous driving systems. Vehicle control system 10a according to the present variation will be described hereinafter, focusing on the differences from vehicle control system 10 according to the embodiment. The same or similar elements as those in vehicle control system 10 according to the embodiment will be given the same reference signs as those in vehicle control system 10 according to the embodiment, and descriptions thereof will be simplified or omitted.

As illustrated in FIG. 33, vehicle control system 10a includes remote operation device 130a and vehicle 200a.

Vehicle 200a includes autonomous driving system 260 instead of autonomous driving system 230 provided in vehicle 200 of the embodiment. Autonomous driving system 260 is configured including a plurality of autonomous driving systems.

Autonomous driving system 260 according to the present variation includes first autonomous driving system 230a and second autonomous driving system 230b.

First autonomous driving system 230a is a system that operates when traveling in the autonomous driving mode, and includes first travel ability determiner 231a and first autonomous driving traveler 232a.

First travel ability determiner 231a determines whether travel is possible in the autonomous travel mode. First travel ability determiner 231a stores constraints in the autonomous travel mode and determines whether travel is possible in the autonomous travel mode based on the constraints and the vehicle information.

First autonomous driving traveler 232a generates a travel plan for the autonomous travel mode based on the vehicle information. The travel plan includes a travel path, a speed, and the like. Additionally, if the result of the determination by travel continuability determiner 164 indicates that travel can be continued, first autonomous driving traveler 232a outputs control information based on the travel plan to vehicle controller 240 in order to execute the generated travel plan.

Second autonomous driving system 230b is a system that operates when traveling in the ODD relaxed travel mode, and includes second travel ability determiner 231b and second autonomous driving traveler 232b.

Second travel ability determiner 231b determines whether travel is possible in the ODD relaxed travel mode. Second travel ability determiner 231a stores constraints in the ODD relaxed travel mode and determines whether travel is possible in the ODD relaxed travel mode based on the constraints and the vehicle information.

Second autonomous driving traveler 232b generates a travel plan for the ODD relaxed travel mode based on the vehicle information. The travel plan includes a travel path, a speed, and the like. Additionally, if the result of the determination by travel continuability determiner 164 indicates that travel can be continued, second autonomous driving traveler 232b outputs control information based on the travel plan to vehicle controller 240 in order to execute the generated travel plan.

Although autonomous driving system 260 is illustrated as including autonomous driving systems in FIG. 33, the number of autonomous driving systems is not limited, and there may be three or more autonomous driving systems.

Mode changer 151 outputs, to vehicle 200a, a signal for operating the autonomous driving system corresponding to the travel mode to which a switch is made. For example, when traveling in the autonomous travel mode, mode changer 151 outputs, to vehicle 200a, a signal for operating only first autonomous driving system 230a among the plurality of autonomous driving systems. Additionally, for example, when traveling in the ODD relaxed travel mode, mode changer 151 outputs, to vehicle 200a, a signal for operating only second autonomous driving system 230b among the plurality of autonomous driving systems. In this manner, of the plurality of autonomous driving systems included in autonomous driving system 260, mode changer 151 causes only the autonomous driving system corresponding to the travel mode after the switch to operate.

Safety determiner 160a of remote operating party H need not include storage that stores the ODD and constraints of the ODD relaxed travel mode.

Note that remote operation device 130a may include storage (not shown) that stores information indicating the correspondence between the plurality of autonomous driving systems included in vehicle 200a and the travel modes.

As described above, vehicle 200a may be configured having an autonomous driving system for each travel mode. For example, if there are a plurality of ODD relaxed travel modes, one autonomous driving system is provided for each of the plurality of ODD relaxed travel modes.

Accordingly, mode changer 151 need only transmit information pertaining to the autonomous driving system to be operated to vehicle 200a, which makes it possible to reduce the amount of communication between vehicle 200a and remote operation device 130a. In addition, the processing of changing settings pertaining to the determination as to whether travel is possible by the travel ability determiner can be omitted, and thus the time required for switching the travel mode can be shortened. As such, the safety of vehicle 200a when switching travel modes can be improved compared to the case where the switch takes more time.

Other Embodiments

The present disclosure has been described thus far based on an embodiment and a variation (also called "an embodiment and the like" hereinafter), but the present disclosure is not limited to the foregoing embodiment and the like. Variations on the present embodiment conceived by one skilled in the art, embodiments implemented by combining constituent elements from different other embodiments, and the like may be included in the scope of one or more aspects of the present disclosure as well, as long as they do not depart from the essential spirit of the present disclosure.

For example, although the foregoing embodiment and the like describe an example in which the constraints are tightened when the ODD is relaxed, the configuration is not limited thereto. Depending on the degree of the relaxation level of the ODD, the constraints may not need to be tightened if the remote operating party is remotely supervising.

In the foregoing embodiment and the like, when the constraints are tightened in response to the relaxation of the ODD, it is sufficient to tighten at least one of the vehicle conditions, the safety supervision conditions, and the system conditions included in the constraints.

The foregoing embodiment and the like describe an example in which travel in the ODD relaxed travel mode is continued by the remote operating party operating a button to continue traveling in the ODD relaxed travel mode is described, but the configuration is not limited thereto. For example, whether to continue traveling in the ODD relaxed travel mode may be determined based on the attitude with respect to supervision of the remote operating party during travel in the ODD relaxed travel mode. The travel continuability determiner may, for example, determine whether to continue driving in the ODD relaxed travel mode based on the line of sight of the remote operating party. Through this, if the remote operating party is not focusing on the screen of the display device during travel in the ODD relaxed travel mode, the safety supervision conditions in the constraints are not satisfied, and thus the travel in the ODD relaxed travel mode can be stopped automatically.

The foregoing embodiment and the like describe an example in which the remote operating party supervises remotely during travel in the ODD relaxed travel mode, but the configuration is not limited thereto. The remote operating party may perform some of the driving operations during travel in the ODD relaxed travel mode. The remote operating party may control the speed of the vehicle in the ODD relaxed travel mode by, for example, operating the accelerator pedal and the brake pedal. Even in this case, the burden on the remote operating party can be reduced compared to travel in the remote operation mode.

The foregoing embodiment and the like describe an example in which the display device presents an overhead image, but the configuration is not limited thereto. The display device may, for example, present a 360-degree image, or may re-composite images to present a third-person viewpoint image. The display device may also present object information detected by a sensor (e.g., an object detection sensor) installed in the vehicle. The object information includes at least one of the position, size, speed, and the like of an object.

The order of the plurality of processes described in the foregoing embodiment and the like is an example. The order of the plurality of processes may be changed, and a plurality of processes may be executed in parallel. Some of the plurality of processes may not be executed.

Each of the constituent elements described in the foregoing embodiment and the like may be realized as software, or typically as an LSI circuit, which is an integrated circuit. These devices can be implemented individually as single chips, or may be implemented with a single chip including some or all of the devices. Although the term "LSI" is used here, other names, such as IC, system LSI, super LSI, ultra LSI, and so on are used depending on the degree of integration. Furthermore, the manner in which the circuit integration is achieved is not limited to LSI, and it is also possible to use a dedicated circuit or a generic processor. It is also possible to employ a FPGA (Field Programmable Gate Array) which is programmable after the LSI circuit has been manufactured, or a reconfigurable processor in which the connections or settings of the circuit cells within the LSI circuit can be reconfigured. Furthermore, if other technologies that improve upon or are derived from semiconductor technology enable integration technology to replace LSI circuits, then naturally it is also possible to integrate the constituent elements using that technology.

Additionally, the divisions of the function blocks in the block diagrams are merely examples, and a plurality of function blocks may be realized as a single function block, a single function block may be divided into a plurality of function blocks, or some functions may be transferred to other function blocks. Additionally, the functions of a plurality of function blocks having similar functions may be processed by a single instance of hardware or software, in parallel or time-divided.

The remote operation device provided in the vehicle control system may be realized as a single device or by a plurality of devices. For example, each processing block of the remote operation device may be realized by two or more devices. For example, the remote operator and the safety determiner may be implemented in different devices (e.g., server devices). If the remote operation system is realized by a plurality of devices, the constituent element provided in the remote operation system may be distributed among the plurality of in any manner. The method for communication among the plurality of devices is not particularly limited either.

Furthermore, the technique according to the present disclosure may be the above-described program, or a non-transitory computer-readable recording medium in which the above-described program is recorded. It goes without saying that the above-described program can also be distributed via a transmission medium such as the Internet. For example, the above-described program and a digital signal constituting the above-described program may be transmitted via a telecommunication line, a wireless or wired communication line, a network such as the Internet, a data broadcast, or the like. Additionally, the above-described program and a digital signal constituting the above-described program may be executed by another independent computer system, by being recorded in the recording medium and transferring the recording medium, or by being transferred over the network or the like.

In the embodiments, the constituent elements are constituted by dedicated hardware. However, the constituent elements may be realized by executing software programs corresponding to those constituent elements. Each constituent element may be realized by a program executing unit such as a CPU or a processor reading out and executing a software program recorded into a recording medium such as a hard disk or semiconductor memory.

INDUSTRIAL APPLICABILITY

The present disclosure is widely applicable to systems that operate moving bodies that capable of traveling through autonomous driving.

The invention claimed is:

1. An information processing method performed by an information processing device including a processor, the information processing method comprising:
using the processor:
obtaining first information indicating whether a moving body traveling autonomously under a first condition pertaining to safety of the moving body can continue traveling autonomously, the moving body being connected to the information processing device over a network; and
when the first information indicates that the moving body cannot continue traveling autonomously under the first condition, outputting, to the moving body, a first command for causing the moving body to operate in a first mode of driving autonomously under a second condition in which a condition pertaining to the safety of the moving body is more relaxed than the first condition, in a state where a remote operating party of the moving body remotely supervises the moving body without remotely operating the moving body,
wherein the first condition and the second condition each includes a condition for determining whether the moving body can continue traveling autonomously,
wherein the information processing method further comprises:
identifying a second restriction that satisfies constraints among one or more second restrictions based on at least one of remote operation information pertaining to at least one of the information processing device or the remote operating party and system information indicating specifications of a system including the information processing device and the moving body, the one or more second restrictions being restrictions on a movement mode of autonomous driving which is set preliminarily, and
determining, as the second condition, a condition pertaining to safety of the moving body corresponding to the second restriction identified,
wherein a constraint of each of the one or more second restrictions is a constraint tighter than a constraint of a first restriction of a movement mode of autonomous driving corresponding to the first condition,
when the moving body travels autonomously, a first requirement for when the moving body travels autonomously is set, the first requirement indicating a supervision requirement for when the remote operating party supervises the moving body, and
when the moving body is caused to operate in the first mode, a second requirement in which the supervision requirement is tighter than the first requirement is set according to the second condition,
displaying the supervision requirement that has been tightened in a display device used by the remote operating party, and
causing the moving body to drive autonomously under the second condition only during supervision by the remote operating party under the supervision requirement that has been tightened.

2. The information processing method according to claim 1, further comprising:
tightening a restriction on a movement mode of autonomous driving according to the second condition when the moving body is caused to operate in the first mode.

3. The information processing method according to claim 2, wherein the movement mode includes at least one of a speed, a steering angle, and an acceleration of the moving body, and
at least one restriction of a maximum speed, a maximum steering angle, and a maximum acceleration during autonomous driving is tightened according to the second condition.

4. The information processing method according to claim 1,
wherein the supervision requirement includes at least one of a supervised area and a supervised object, the supervised area being an area around the moving body required to be supervised by the remote operating party, and the supervised object being an object required to be supervised by the remote operating party, and
tightening the supervision requirement includes intensifying supervision of at least one of the supervised area and the supervised object according to the second condition.

5. The information processing method according to claim 1,
wherein the supervision requirement includes an operation of the moving body required to be supervised by the remote operating party, and
tightening the supervision requirement includes adding supervision of a travel plan or travel control information of the moving body according to the second condition.

6. The information processing method according to claim 1,
wherein the supervision under the supervision requirement that has been tightened corresponds to a period in which an operation by the remote operating party is detected, the operation indicating that the autonomous driving is to be continued under the second condition.

7. The information processing method according to claim 1,
wherein when causing the moving body to operate in the first mode, a requirement for processing pertaining to supervision by the remote operating party or for communication delay is tightened according to the second condition.

8. The information processing method according to claim 1, further comprising:
outputting the first command or a second command when the first information indicates that the moving body cannot continue traveling autonomously, the second command being for causing the moving body to operate in a second mode in which the remote operating party remotely operates the moving body.

9. The information processing method according to claim 8, further comprising:
displaying second information for switching operation of the moving body to the first mode or the second mode in a display device used by the remote operating party when it is determined, based on the first information, that the moving body cannot continue traveling autonomously, and
outputting a command for causing the moving body to operate in the first mode or the second mode based on information input by the remote operating party as a response to the second information.

10. The information processing method according to claim 1, further comprising:
displaying, when the moving body drives autonomously under the second condition, an image in which a travel region of the moving body and a region required to be supervised by the remote operating party in the travel region are superimposed in a visible state in a display device used by the remote operating party.

11. The information processing method according to claim 10, further comprising:
displaying, in the display device, at least one of information pertaining to a movement path of the moving body or a result of determining whether movement is possible in a current operating mode.

12. The information processing method according to claim 1,
wherein the first information is determined based on the first condition and information pertaining to a state or a specification of the moving body.

13. The information processing method according to claim 1,
wherein the first condition and the second condition each includes: information indicating an object to be passed by the moving body while traveling autonomously; information indicating an area in which the moving body is travelable autonomously; a condition related to weather and a disaster that prohibits the moving body from traveling autonomously; and a road surface state that prohibits the moving body from traveling autonomously,
in the identifying of the second restriction:
a set of a relaxed condition that satisfies a constraint and the constraint is searched from among a plurality of sets of: a relaxed condition in which a condition pertaining to the safety of the moving body is more relaxed than the first condition stored in storage; and a constraint corresponding to the relaxed condition,
the relaxed condition that satisfies the constraint is the second condition, and
the constraint includes at least one of a maximum vehicle speed of the moving body, a maximum steering angle of the moving body, a maximum acceleration of the moving body, a supervision requirement for when the remote operating party supervises the moving body, and a maximum value of communication delay of the system.

14. The information processing method according to claim 1,
wherein the first condition and the second condition each includes information indicating an object to be passed by the moving body while traveling autonomously,
in the second condition, as relaxation of the condition pertaining to the safety, an other object to be passed by the moving body is added aside from the object to be passed by the moving body in the first condition,
a constraint of the moving body while traveling in the first mode is more tightened than a constraint of the moving body while traveling in a travel mode which permits autonomous traveling under the first condition, and
the constraint includes at least one of a maximum vehicle speed of the moving body, a maximum steering angle of the moving body, a maximum acceleration of the moving body, and a supervision requirement for when the remote operating party supervises the moving body.

15. The information processing method according to claim 1,
wherein the first condition and the second condition each includes a condition that prohibits the moving body from traveling autonomously,
in the second condition, as relaxation of the condition pertaining to the safety, at least one condition is reduced from conditions related to weather and a disaster in the first condition,
a constraint of the moving body while traveling in the first mode is more tightened than a constraint of the moving body while traveling in a travel mode which permits autonomous traveling under the first condition, and
the constraint includes at least one of a maximum vehicle speed of the moving body, a maximum steering angle of the moving body, a maximum acceleration of the moving body, and a supervision requirement for when the remote operating party supervises the moving body.

16. The information processing method according to claim 1,
wherein the first condition and the second condition each includes a road surface state that prohibits the moving body from traveling autonomously,
in the second condition, as relaxation of the condition pertaining to the safety, at least one road surface state is reduced from road surface states that prohibits the moving body from traveling in the first condition, the road surface states each being the at least one road surface state,
a constraint of the moving body while traveling in the first mode is more tightened than a constraint of the moving body while traveling in a travel mode which permits autonomous traveling under the first condition, and
the constraint includes at least one of a maximum vehicle speed of the moving body, a maximum steering angle of the moving body, a maximum acceleration of the moving body, and a supervision requirement for when the remote operating party supervises the moving body.

17. An information processing system comprising:
a processor; and
a memory;
wherein, the processor is configured to, using the memory:
obtain first information indicating whether a moving body traveling autonomously under a first condition pertaining to safety of the moving body can continue traveling autonomously, the moving body being connected to an information processing device over a network; and when the first information indicates that the moving body cannot continue traveling autonomously under the first condition, output, to the moving body, a first command for causing the moving body to operate in a first mode of driving autonomously under a second condition in which a condition pertaining to the safety of the moving body is more relaxed than the first condition, in a state where a remote operating party of the moving body remotely supervises the moving body without remotely operating the moving body, wherein the first condition and the second condition each includes a condition for determining whether the moving body can continue traveling autonomously, wherein the processor is further configured to, using the memory:

identify a second restriction that satisfies constraints among one or more second restrictions based on at least one of remote operation information pertaining to at least one of the information processing device or the remote operating party and system information indicating specifications of a system including the information processing device and the moving body, the one or more second restrictions being restrictions on a movement mode of autonomous driving which is set preliminarily, and determine, as the second condition, a condition pertaining to safety of the moving body corresponding to the second restriction identified, wherein a constraint of each of the one or more second restrictions is a constraint tighter than a constraint of a first restriction of a movement mode of autonomous driving corresponding to the first condition, when the moving body travels autonomously, a first requirement for when the moving body travels autonomously is set, the first requirement indicating a supervision requirement for when the remote operating party supervises the moving body, and when the moving body is caused to operate in the first mode, a second requirement in which the supervision requirement is tighter than the first requirement is set according to the second condition, displaying the supervision requirement that has been tightened in a display device used by the remote operating party, and causing the moving body to drive autonomously under the second condition only during supervision by the remote operating party under the supervision requirement that has been tightened.

* * * * *